United States Patent
Marshall et al.

(10) Patent No.: US 9,904,379 B2
(45) Date of Patent: Feb. 27, 2018

(54) DISABLING STYLUS TO PREVENT WORN TIP PERFORMANCE DEGRADATION AND SCREEN DAMAGE

(71) Applicant: Apple Inc., Cupertino, CA (US)

(72) Inventors: Blake R. Marshall, San Jose, CA (US); Apexit Shah, Sunnyvale, CA (US); Ari Y. Benbasat, San Francisco, CA (US); Li-Quan Tan, Sunnyvale, CA (US); Priyanka Bhandari, San Francisco, CA (US); Reza Nasiri Mahalati, Belmont, CA (US); Sarah M. Bolton, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 150 days.

(21) Appl. No.: 15/057,058

(22) Filed: Feb. 29, 2016

(65) Prior Publication Data

US 2017/0249028 A1 Aug. 31, 2017

(51) Int. Cl.
  *G06F 3/044* (2006.01)
  *G06F 3/0354* (2013.01)
  *G06F 3/041* (2006.01)

(52) U.S. Cl.
  CPC .......... *G06F 3/03545* (2013.01); *G06F 3/044* (2013.01); *G06F 3/0418* (2013.01)

(58) Field of Classification Search
  CPC ....... G06F 3/03545; G06F 3/14; G06F 3/0416
  See application file for complete search history.

(56) References Cited

U.S. PATENT DOCUMENTS

| | | | |
|---|---|---|---|
| 5,483,261 A | 1/1996 | Yasutake | |
| 5,488,204 A | 1/1996 | Mead et al. | |
| 5,825,352 A | 10/1998 | Bisset et al. | |
| 5,835,079 A | 11/1998 | Shieh | |
| 5,880,411 A | 3/1999 | Gillespie et al. | |

(Continued)

FOREIGN PATENT DOCUMENTS

| | | | |
|---|---|---|---|
| JP | 2000-163031 A | 6/2000 | |
| JP | 2002-342033 A | 11/2002 | |

OTHER PUBLICATIONS

Lee, S.K. et al. (Apr. 1985). "A Multi-Touch Three Dimensional Touch-Sensitive Tablet," *Proceedings of CHI: ACM Conference on Human Factors in Computing Systems*, pp. 21-25.

(Continued)

*Primary Examiner* — Ibrahim A Khan
(74) *Attorney, Agent, or Firm* — Morrison & Foerster LLP

(57) ABSTRACT

A level of wear of a stylus tip can be estimated and in accordance with a determination that the level of wear of the stylus tip exceeds a threshold, the stylus input functionality of an electronic device can be disabled. The threshold can be set such that the stylus can be disabled before the stylus sensing performance degrades to a degree perceptible to a human and/or before exposing internal portions of the stylus that can scratch a touch screen. Additionally or alternatively, a notification can be provided to indicate to a user that the stylus tip should be replaced. In some examples, the estimated level of wear can also be used to provide warning notifications. Stylus tip wear can be estimated, for example, based on a detected total signal strength or based on an estimated total distance traversed by the stylus tip across a surface.

22 Claims, 11 Drawing Sheets

(56) References Cited

U.S. PATENT DOCUMENTS

| | | | |
|---|---|---|---|
| 6,188,391 | B1 | 2/2001 | Seely et al. |
| 6,310,610 | B1 | 10/2001 | Beaton et al. |
| 6,323,846 | B1 | 11/2001 | Westerman et al. |
| 6,690,387 | B2 | 2/2004 | Zimmerman et al. |
| 7,015,894 | B2 | 3/2006 | Morohoshi |
| 7,184,064 | B2 | 2/2007 | Zimmerman et al. |
| 7,663,607 | B2 | 2/2010 | Hotelling et al. |
| 8,479,122 | B2 | 7/2013 | Hotelling et al. |
| 8,937,609 | B2 | 1/2015 | Yoshida et al. |
| 9,189,121 | B2 | 11/2015 | Shahparnia et al. |
| 9,244,543 | B1 * | 1/2016 | Sundara-Rajan ... G06F 3/03545 |
| 9,612,671 | B1 * | 4/2017 | Blaszczak .............. G06F 3/039 |
| 2006/0197753 | A1 | 9/2006 | Hotelling |

OTHER PUBLICATIONS

Rubine, D.H. (Dec. 1991). "The Automatic Recognition of Gestures," CMU-CS-91-202, Submitted in Partial Fulfillment of the Requirements for the Degree of Doctor of Philosophy in Computer Science at Carnegie Mellon University, 285 pages.

Rubine, D.H. (May 1992). "Combining Gestures and Direct Manipulation," CHI '92, pp. 659-660.

Westerman, W. (Spring 1999). "Hand Tracking, Finger Identification, and Chordic Manipulation on a Multi-Touch Surface," A Dissertation Submitted to the Faculty of the University of Delaware in Partial Fulfillment of the Requirements for the Degree of Doctor of Philosophy in Electrical Engineering, 364 pages.

\* cited by examiner

DISABLING STYLUS TO PREVENT WORN TIP PERFORMANCE DEGRADATION AND SCREEN DAMAGE

FIELD

This relates generally to input devices for use with touch-sensitive devices and, more specifically, to tracking stylus tip wear to prevent performance degradation and screen damage.

BACKGROUND

Many types of input devices are presently available for performing operations in a computing system, such as buttons or keys, mice, trackballs, joysticks, touch panels, touch screens and the like. Touch-sensitive devices, and touch screens in particular, are quite popular because of their ease and versatility of operation as well as their affordable prices. A touch-sensitive device can include a touch panel, which can be a clear panel with a touch-sensitive surface, and a display device such as a liquid crystal display (LCD) that can be positioned partially or fully behind the panel so that the touch-sensitive surface can cover at least a portion of the viewable area of the display device. The touch-sensitive device can allow a user to perform various functions by touching or hovering over the touch panel using a finger, stylus or other object at a location often dictated by a user interface (UI) being displayed by the display device. In general, the touch-sensitive device can recognize a touch or hover event and the position of the event on the touch panel, and the computing system can then interpret the event in accordance with the display appearing at the time of the event, and thereafter can perform one or more actions based on the event.

Styli have become popular input devices for touch-sensitive devices. In particular, use of an active stylus capable of generating stylus stimulation signals that can be sensed by the touch-sensitive device can improve the precision and control of the stylus. However, wear of the stylus tip can degrade stylus sensing performance and/or damage the touch-sensitive device itself.

SUMMARY

This relates to preventing or reducing the risk of damage to a touch-sensitive device from a stylus with a worn tip and/or ensuring adequate stylus sensing performance. In some examples, a level of wear of a stylus tip can be estimated and in accordance with a determination that the level of wear of the stylus tip exceeds a threshold, the stylus input functionality of an electronic device can be disabled. The threshold can be set such that the stylus can be disabled before the stylus sensing performance degrades to a degree perceptible to a human and/or before exposing internal portions of the stylus that can scratch a touch screen. Additionally or alternatively, a notification can be provided to indicate to a user that the stylus tip should be replaced. In some examples, the estimated level of wear can also be used to provide warning notifications. Stylus tip wear can be estimated, for example, based on a detected total signal strength of one or more inputs from the stylus tip. In some examples, the wear can be estimated based on an estimated total distance traversed by the stylus tip across the surface of a touch sensor panel or touch screen. In some examples, a stylus tip can change color as outer layers of the stylus tip are worn away, and the change in color can indicate to a user that the stylus tip should be changed. In some examples, wobble observable to a human user can indicate to the user that the stylus tip should be changed (or that the entire stylus should be replaced).

DETAILED DESCRIPTION

In the following description of examples, reference is made to the accompanying drawings in which it is shown by way of illustration specific examples that can be practiced. It is to be understood that other examples can be used and structural changes can be made without departing from the scope of the various examples.

This relates to preventing or reducing the risk of damage to a touch-sensitive device from a stylus with a worn tip and/or ensuring adequate stylus sensing performance. In some examples, a level of wear of a stylus tip can be estimated and in accordance with a determination that the level of wear of the stylus tip exceeds a threshold, the stylus input functionality of an electronic device can be disabled. The threshold can be set such that the stylus can be disabled before the stylus sensing performance degrades to a degree perceptible to a human and/or before exposing internal portions of the stylus that can scratch a touch screen. Additionally or alternatively, a notification can be provided to indicate to a user that the stylus tip should be replaced. In some examples, the estimated level of wear can also be used to provide warning notifications. Stylus tip wear can be estimated, for example, based on a detected total signal strength of one or more inputs from the stylus tip. In some examples, the wear can be estimated based on an estimated total distance traversed by the stylus tip across the surface of a touch sensor panel or touch screen. In some examples, a stylus tip can change color as outer layers of the stylus tip are worn away, and the change in color can indicate to a user that the stylus tip should be changed. In some examples, wobble observable to a human user can indicate to the user that the stylus tip should be changed (or that the entire stylus should be replaced).

Figure 1A:
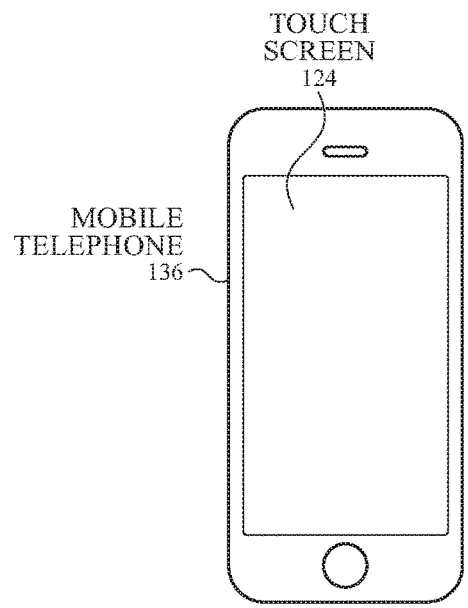
FIGS. 1A-1D illustrate examples of systems with touch screens that can accept input from an active stylus according to examples of the disclosure.
Figure 1B:
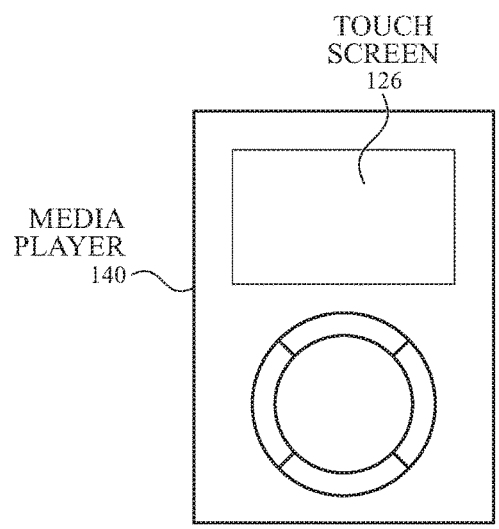
Figure 1C:
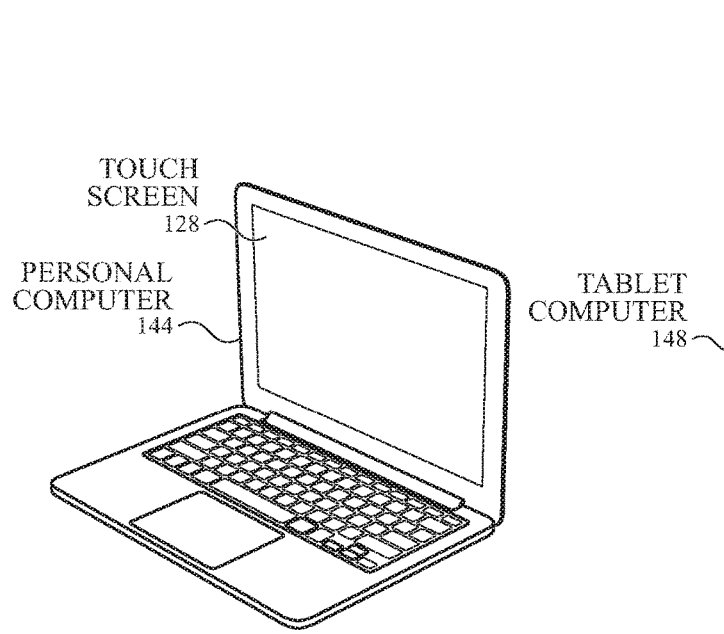
Figure 1D:
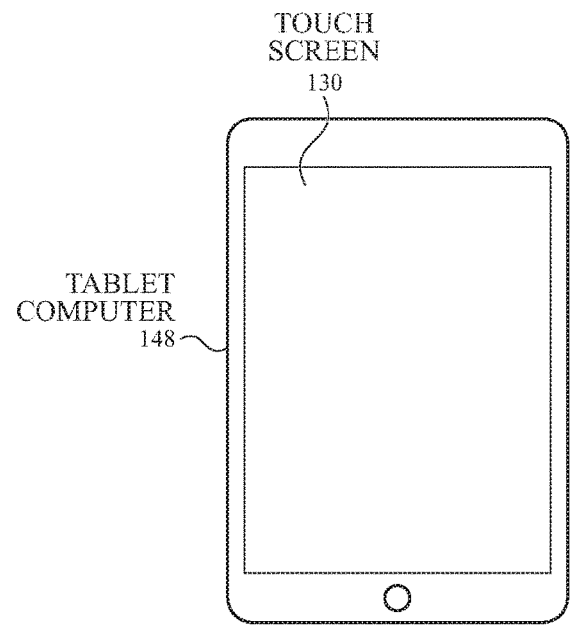

FIGS. 1A-1D illustrate examples of systems with touch screens that can accept input from an active stylus according to examples of the disclosure. FIG. 1A illustrates an exemplary mobile telephone 136 that includes a touch screen 124 that can accept input from an active stylus according to examples of the disclosure. FIG. 1B illustrates an example digital media player 140 that includes a touch screen 126 that can accept input from an active stylus according to examples of the disclosure. FIG. 1C illustrates an example personal computer 144 that includes a touch screen 128 that can accept input from an active stylus according to examples of the disclosure. FIG. 1D illustrates an example tablet computing device 148 that includes a touch screen 130 that can accept input from an active stylus according to examples of the disclosure. Other devices, including wearable devices, can accept input from an active stylus according to examples of the disclosure.

Touch screens 124, 126, 128 and 130 can be based on, for example, self-capacitance or mutual capacitance sensing technology, or another touch sensing technology. For example, in a self-capacitance based touch system, an individual electrode with a self-capacitance to ground can be used to form a touch pixel (touch node) for detecting touch. As an object approaches the touch pixel, an additional capacitance to ground can be formed between the object and the touch pixel. The additional capacitance to ground can result in a net increase in the self-capacitance seen by the touch pixel. This increase in self-capacitance can be detected and measured by a touch sensing system to determine the positions of multiple objects when they touch the touch screen.

A mutual capacitance based touch system can include, for example, drive regions and sense regions, such as drive lines and sense lines. For example, drive lines can be formed in rows while sense lines can be formed in columns (i.e., orthogonal). Touch pixels (touch nodes) can be formed at the intersections or adjacencies (in single layer configurations) of the rows and columns. During operation, the rows can be stimulated with an alternating current (AC) waveform and a mutual capacitance can be formed between the row and the column of the touch pixel. As an object approaches the touch pixel, some of the charge being coupled between the row and column of the touch pixel can instead be coupled onto the object. This reduction in charge coupling across the touch pixel can result in a net decrease in the mutual capacitance between the row and the column and a reduction in the AC waveform being coupled across the touch pixel. This reduction in the charge-coupled AC waveform can be detected and measured by the touch sensing system to determine the positions of multiple objects when they touch the touch screen. In some examples, a touch screen can be multi-touch, single touch, projection scan, full-imaging multi-touch, or any capacitive touch.

Figure 2:
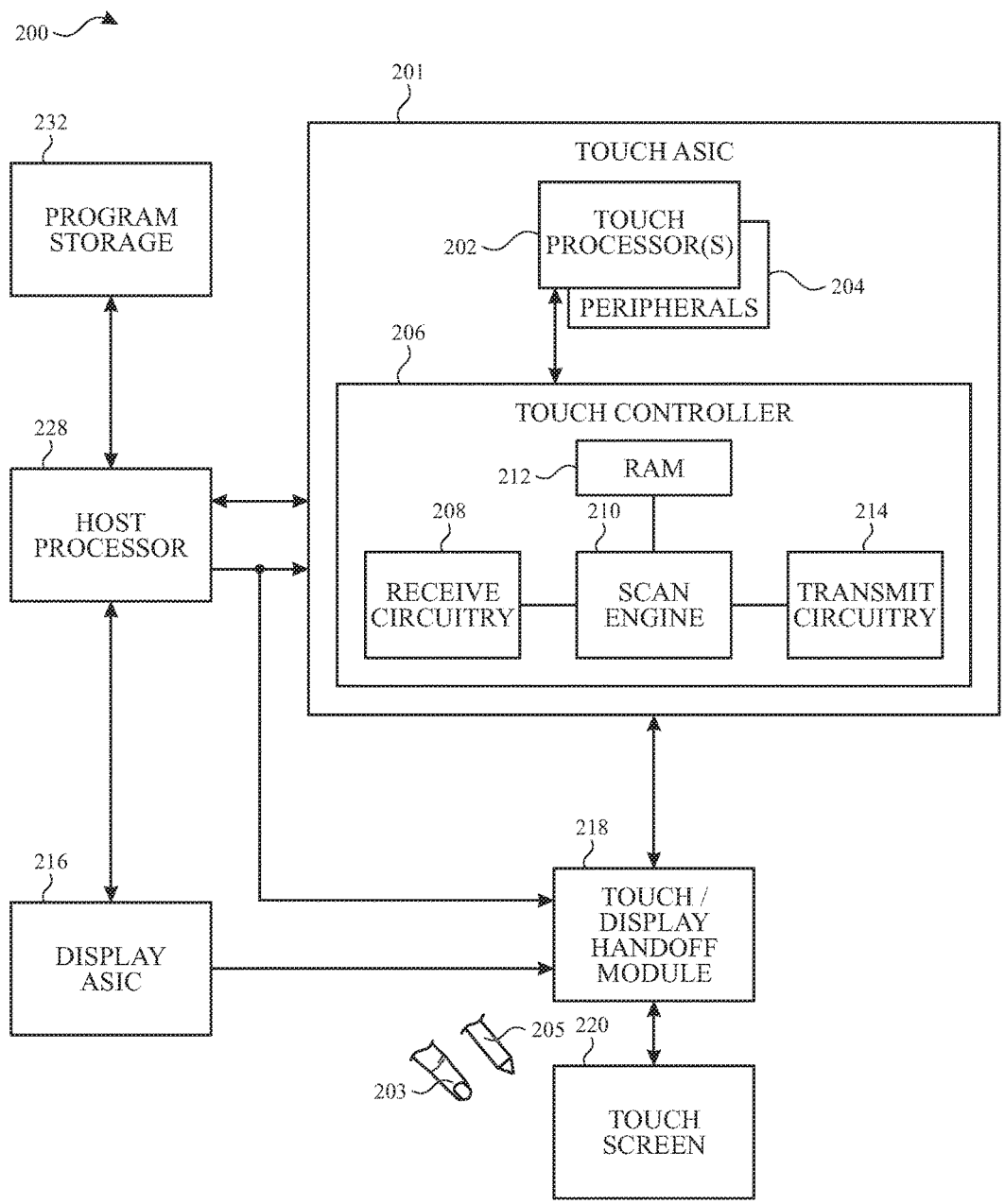
FIG. 2 illustrates a block diagram of an example computing system that can receive input from an active stylus according to examples of the disclosure.

FIG. 2 illustrates a block diagram of an example computing system 200 that can receive input from an active stylus according to examples of the disclosure. Computing system 200 could be included in, for example, mobile telephone 136, digital media player 140, personal computer 144, tablet computing device 148, wearable device, or any mobile or non-mobile computing device that includes a touch screen. Computing system 200 can include an integrated touch screen 220 to display images and to detect touch and/or proximity (e.g., hover) events from an object (e.g., finger 203 or active or passive stylus 205) at or proximate to the surface of the touch screen 220. Computing system 200 can also include an application specific integrated circuit ("ASIC") illustrated as touch ASIC 201 to perform touch and/or stylus sensing operations. Touch ASIC 201 can include one or more touch processors 202, peripherals 204, and touch controller 206. Touch ASIC 201 can be coupled to touch sensing circuitry of touch screen 220 to perform touch and/or stylus sensing operations (described in more detail below). Peripherals 204 can include, but are not limited to, random access memory (RAM) or other types of memory or storage, watchdog timers and the like. Touch controller 206 can include, but is not limited to, one or more sense channels in receive circuitry 208, panel scan engine 210 (which can include channel scan logic) and transmit circuitry 214 (which can include analog or digital driver logic). In some examples, the transmit circuitry 214 and receive circuitry 208 can be reconfigurable by the panel scan engine 210 based the scan event to be executed (e.g., mutual capacitance row-column scan, mutual capacitance row-row scan, mutual capacitance column-column scan, row self-capacitance scan, column self-capacitance scan, touch spectral analysis scan, stylus spectral analysis scan, stylus scan, etc.). Panel scan engine 210 can access RAM 212, autonomously read data from the sense channels and provide control for the sense channels. The touch controller 206 can also include a scan plan (e.g., stored in RAM 212) which can define a sequence of scan events to be performed at the touch screen. The scan plan can include information necessary for configuring or reconfiguring the transmit circuitry and receive circuitry for the specific scan event to be performed. Results (e.g., touch signals or touch data) from the various scans can also be stored in RAM 212. In addition, panel scan engine 210 can provide control for transmit circuitry 214 to generate stimulation signals at various frequencies and/or phases that can be selectively applied to drive regions of the touch sensing circuitry of touch screen 220. Touch controller 206 can also include a spectral analyzer to determine low noise frequencies for touch and stylus scanning. The spectral analyzer can perform spectral analysis on the scan results from an unstimulated touch screen. Although illustrated in FIG. 2 as a single ASIC, the various components and/or functionality of the touch ASIC 201 can be implemented with multiple circuits, elements, chips, and/or discrete components.

Computing system 200 can also include an application specific integrated circuit illustrated as display ASIC 216 to perform display operations. Display ASIC 216 can include hardware to process one or more still images and/or one or more video sequences for display on touch screen 220. Display ASIC 216 can be configured to generate read memory operations to read the data representing the frame/video sequence from a memory (not shown) through a memory controller (not shown), for example. Display ASIC 216 can be configured to perform various processing on the image data (e.g., still images, video sequences, etc.). In some examples, display ASIC 216 can be configured to scale still images and to dither, scale and/or perform color space conversion on the frames of a video sequence. Display ASIC 216 can be configured to blend the still image frames and the video sequence frames to produce output frames for display. Display ASIC 216 can also be more generally referred to as a display controller, display pipe, display control unit, or display pipeline. The display control unit can be generally any hardware and/or firmware configured to prepare a frame for display from one or more sources (e.g., still images and/or video sequences). More particularly, display ASIC 216 can be configured to retrieve source frames from one or more source buffers stored in memory, composite frames from the source buffers, and display the resulting frames on touch screen 220. Accordingly, display ASIC 216 can be configured to read one or more source buffers and composite the image data to generate the output frame.

Display ASIC 216 can provide various control and data signals to the display, including timing signals (e.g., one or more clock signals) and/or vertical blanking period and horizontal blanking interval controls. The timing signals can include a pixel clock that can indicate transmission of a pixel. The data signals can include color signals (e.g., red, green, blue). The display ASIC 216 can control the touch screen 220 in real-time, providing the data indicating the pixels to be displayed as the touch screen is displaying the image indicated by the frame. The interface to such a touch screen 220 can be, for example, a video graphics array (VGA) interface, a high definition multimedia interface (HDMI), a digital video interface (DVI), a LCD interface, a plasma interface, or any other suitable interface.

In some examples, a handoff module 218 can also be included in computing system 200. Handoff module 218 can be coupled to the touch ASIC 201, display ASIC 216, and touch screen 220, and can be configured to interface the touch ASIC 201 and display ASIC 216 with touch screen 220. The handoff module 218 can appropriately operate the touch screen 220 according to the scanning/sensing and display instructions from the touch ASIC 201 and the display ASIC 216. In other examples, the display ASIC 216 can be coupled to display circuitry of touch screen 220 and touch ASIC 201 can be coupled to touch sensing circuitry of touch screen 220 without handoff module 218.

Touch screen 220 can use liquid crystal display (LCD) technology, light emitting polymer display (LPD) technology, organic LED (OLED) technology, or organic electro luminescence (OEL) technology, although other display technologies can be used in other examples. In some examples, the touch sensing circuitry and display circuitry of touch screen 220 can be stacked on top of one another. For example, a touch sensor panel can cover some or all of a surface of the display (e.g., fabricated one on top of the next in a single stack-up or formed from adhering together a touch sensor panel stack-up with a display stack-up). In other examples, the touch sensing circuitry and display circuitry of touch screen 220 can be partially or wholly integrated with one another. The integration can be structural and/or functional. For example, some or all of the touch sensing circuitry can be structurally in between the substrate layers of the display (e.g., between two substrates of a display pixel cell). Portions of the touch sensing circuitry formed outside of the display pixel cell can be referred to as "on-cell" portions or layers, whereas portions of the touch sensing circuitry formed inside of the display pixel cell can be referred to as "in cell" portions or layers. Additionally, some electronic components can be shared, and used at times as touch sensing circuitry and at other times as display circuitry. For example, in some examples, common electrodes can be used for display functions during active display refresh and can be used to perform touch sensing functions during touch sensing periods. A touch screen stack-up sharing components between sensing functions and display functions can be referred to as an in-cell touch screen.

Computing system 200 can also include a host processor 228 coupled to the touch ASIC 201, and can receive outputs from touch ASIC 201 (e.g., from touch processor 202 via a communication bus, such as an serial peripheral interface (SPI) bus, for example) and perform actions based on the outputs. Host processor 228 can also be connected to program storage 232 and display ASIC 216. Host processor 228 can, for example, communicate with display ASIC 216 to generate an image on touch screen 220, such as an image of a user interface (UI), and can use touch ASIC 201 (including touch processor 202 and touch controller 206) to detect a touch on or near touch screen 220, such as a touch input to the displayed UI. The touch input can be used by computer programs stored in program storage 232 to perform actions that can include, but are not limited to, moving an object such as a cursor or pointer, scrolling or panning, adjusting control settings, opening a file or document, viewing a menu, making a selection, executing instructions, operating a peripheral device connected to the host device, answering a telephone call, placing a telephone call, terminating a telephone call, changing the volume or audio settings, storing information related to telephone communications such as addresses, frequently dialed numbers, received calls, missed calls, logging onto a computer or a computer network, permitting authorized individuals access to restricted areas of the computer or computer network, loading a user profile associated with a user's preferred arrangement of the computer desktop, permitting access to web content, launching a particular program, encrypting or decoding a message, and/or the like. As described herein, host processor 228 can also perform additional functions that may not be related to touch processing.

Computing system 200 can include one or more processors, which can execute software or firmware implementing various functions. Specifically, for integrated touch screens which share components between touch and/or stylus sensing and display functions, the touch ASIC and display ASIC can be synchronized so as to properly share the circuitry of the touch sensor panel. The one or more processors can include one or more of the one or more touch processors 202, a processor in display ASIC 216, and/or host processor 228. In some examples, the display ASIC 216 and host processor 228 can be integrated into a single ASIC, though in other examples, the host processor 228 and display ASIC 216 can be separate circuits coupled together. In some examples, host processor 228 can act as a master circuit and can generate synchronization signals that can be used by one or more of the display ASIC 216, touch ASIC 201 and handoff module 218 to properly perform sensing and display functions for an in-cell touch screen. The synchronization signals can be communicated directly from the host processor 228 to one or more of the display ASIC 216, touch ASIC 201 and handoff module 218. Alternatively, the synchronization signals can be communicated indirectly (e.g., touch ASIC 201 or handoff module 218 can receive the synchronization signals via the display ASIC 216).

Computing system 200 can also include a wireless module (not shown). The wireless module can implement a wireless communication standard such as a WiFi®, BLUETOOTH™ or the like. The wireless module can be coupled to the touch ASIC 201 and/or host processor 228. The touch ASIC 201 and/or host processor 228 can, for example, transmit scan plan information, timing information, and/or frequency information to the wireless module to enable the wireless module to transmit the information to an active stylus, for example (i.e., a stylus capable generating and injecting a stimulation signal into a touch sensor panel). For example, the computing system 200 can transmit frequency information indicative of one or more low noise frequencies that the stylus can use to generate a stimulation signals. Additionally or alternatively, timing information can be used to synchronize the stylus 205 with the computing system 200, and the scan plan information can be used to indicate to the stylus 205 when the computing system 200 performs a stylus scan and expects stylus stimulation signals (e.g., to save power by generating a stimulus only during a stylus scan period). In some examples, the wireless module can also receive information from peripheral devices, such as an active stylus 205, which can be transmitted to the touch ASIC 201 and/or host processor 228. In other examples, the wireless communication functionality can be incorporated in other components of computing system 200, rather than in a dedicated chip.

Note that one or more of the functions described herein can be performed by firmware stored in memory and executed by the touch processor in touch ASIC 201, or stored in program storage and executed by host processor 228. The firmware can also be stored and/or transported within any non-transitory computer-readable storage medium for use by or in connection with an instruction execution system, apparatus, or device, such as a computer-based system, processor-containing system, or other system that can fetch the instructions from the instruction execution system, apparatus, or device and execute the instructions. In the context of this document, a "non-transitory computer-readable storage medium" can be any medium (excluding a signal) that can contain or store the program for use by or in connection with the instruction execution system, apparatus, or device. The non-transitory computer readable medium storage can include, but is not limited to, an electronic, magnetic, optical, electromagnetic, infrared, or semiconductor system, apparatus or device, a portable computer diskette (magnetic), a random access memory (RAM) (magnetic), a read-only memory (ROM) (magnetic), an erasable programmable read-only memory (EPROM) (magnetic), a portable optical disc such a CD, CD-R, CD-RW, DVD, DVD-R, or DVD-RW, or flash memory such as compact flash cards, secured digital cards, USB memory devices, memory sticks, and the like.

The firmware can also be propagated within any transport medium for use by or in connection with an instruction execution system, apparatus, or device, such as a computer-based system, processor-containing system, or other system that can fetch the instructions from the instruction execution system, apparatus, or device and execute the instructions. In the context of this document, a "transport medium" can be any medium that can communicate, propagate or transport the program for use by or in connection with the instruction execution system, apparatus, or device. The transport readable medium can include, but is not limited to, an electronic, magnetic, optical, electromagnetic or infrared wired or wireless propagation medium.

It is to be understood that the computing system 200 is not limited to the components and configuration of FIG. 2, but can include other or additional components in multiple configurations according to various examples. Additionally, the components of computing system 200 can be included within a single device, or can be distributed between multiple devices.

Figure 3:
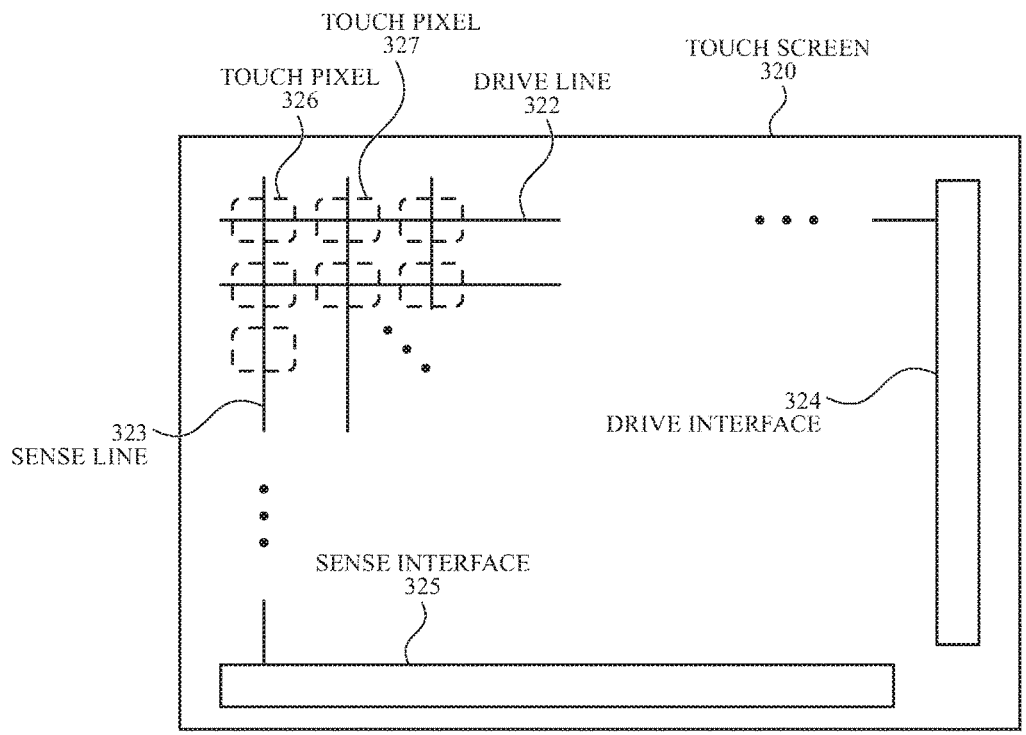
FIG. 3 illustrates an example touch screen including touch sensing circuitry configured as drive and sense regions or lines according to examples of the disclosure.

As discussed above, the touch screen 220 can include touch sensing circuitry. FIG. 3 illustrates an example touch screen including touch sensing circuitry configured as drive and sense regions or lines according to examples of the disclosure. Touch screen 320 can include touch sensing circuitry that can include a capacitive sensing medium having a plurality of drive lines 322 and a plurality of sense lines 323. It should be noted that the term "lines" is sometimes used herein to mean simply conductive pathways, as one skilled in the art will readily understand, and is not limited to elements that are strictly linear, but includes pathways that change direction, and includes pathways of different size, shape, materials, etc. Additionally, the drive lines 322 and sense lines 323 can be formed from smaller electrodes coupled together to form drive lines and sense lines. Drive lines 322 can be driven by stimulation signals from the transmit circuitry 214 through a drive interface 324, and resulting sense signals generated in sense lines 323 can be transmitted through a sense interface 325 to sense channels of receive circuitry 208 (also referred to as an event detection and demodulation circuit) in touch controller 206. In this way, drive lines and sense lines can be part of the touch sensing circuitry that can interact to form capacitive sensing nodes, which can be thought of as touch picture elements (touch pixels), such as touch pixels 326 and 327. This way of understanding can be particularly useful when touch screen 320 is viewed as capturing an "image" of touch. In other words, after touch controller 206 has determined whether a touch has been detected at each touch pixel in the touch screen, the pattern of touch pixels in the touch screen at which a touch occurred can be thought of as an "image" of touch (e.g., a pattern of fingers or other objects touching the touch screen).

It should be understood that the row/drive and column/sense associations can be exemplary, and in other examples, columns can be drive lines and rows can be sense lines. In some examples, row and column electrodes can be perpendicular such that touch nodes can have x and y coordinates, though other coordinate systems can also be used, and the coordinates of the touch nodes can be defined differently. It should be understood that touch screen 220 can include any number of row electrodes and column electrodes to form the desired number and pattern of touch nodes. The electrodes of the touch sensor panel can be configured to perform various scans including some or all of row-column and/or column-row mutual capacitance scans, self-capacitance row and/or column scans, row-row mutual capacitance scans, column-column mutual capacitance scans, and stylus scans.

Figure 4:
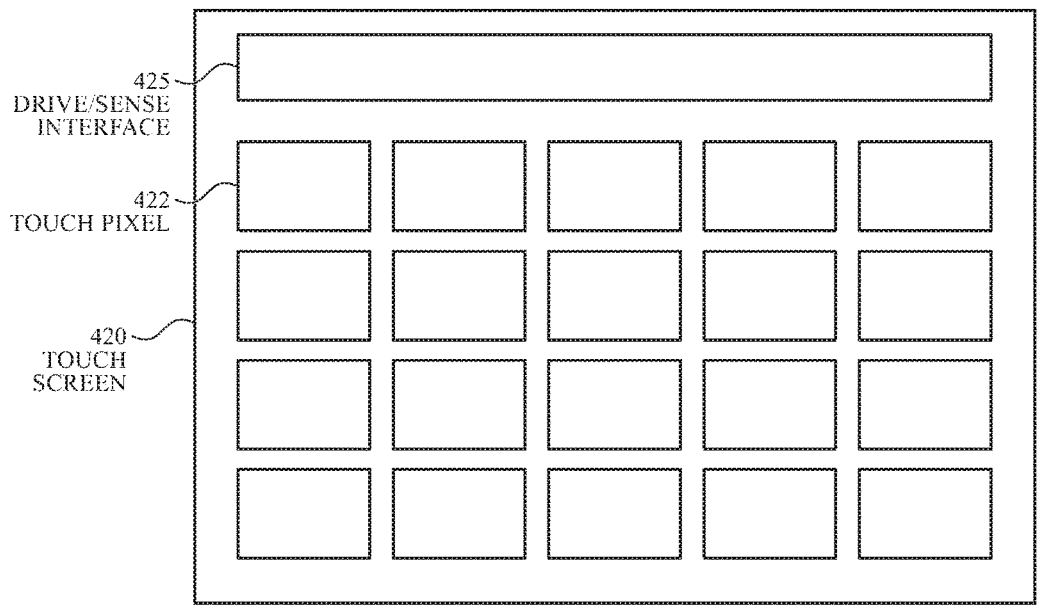
FIG. 4 illustrates an example touch screen including touch sensing circuitry configured as pixelated electrodes according to examples of the disclosure.

Additionally or alternatively, the touch screen can include touch sensing circuitry including an array of pixelated electrodes. FIG. 4 illustrates an example touch screen including touch sensing circuitry configured as pixelated electrodes according to examples of the disclosure. Touch screen 420 can include touch sensing circuitry that can include a capacitive sensing medium having a plurality of electrically isolated touch pixel electrodes 422 (e.g., a pixelated touch screen). For example, in a self-capacitance configuration, touch pixel electrodes 422 can be coupled to sense channels in receive circuitry 208 in touch controller 206, can be driven by stimulation signals from the sense channels (or transmit circuitry 214) through drive/sense interface 425, and can be sensed by the sense channels through the drive/sense interface as well, as described above. Labeling the conductive plates used to detect touch (i.e., touch pixel electrodes 422) as "touch pixel" electrodes can be particularly useful when touch screen 420 is viewed as capturing an "image" of touch. In other words, after touch controller 206 has determined an amount of touch detected at each touch pixel electrode 422 in touch screen 420, the pattern of touch pixel electrodes in the touch screen at which a touch occurred can be thought of as an "image" of touch (e.g., a pattern of fingers or other objects touching the touch screen). The pixelated touch screen can be used to sense mutual capacitance and/or self-capacitance.

Figure 5:
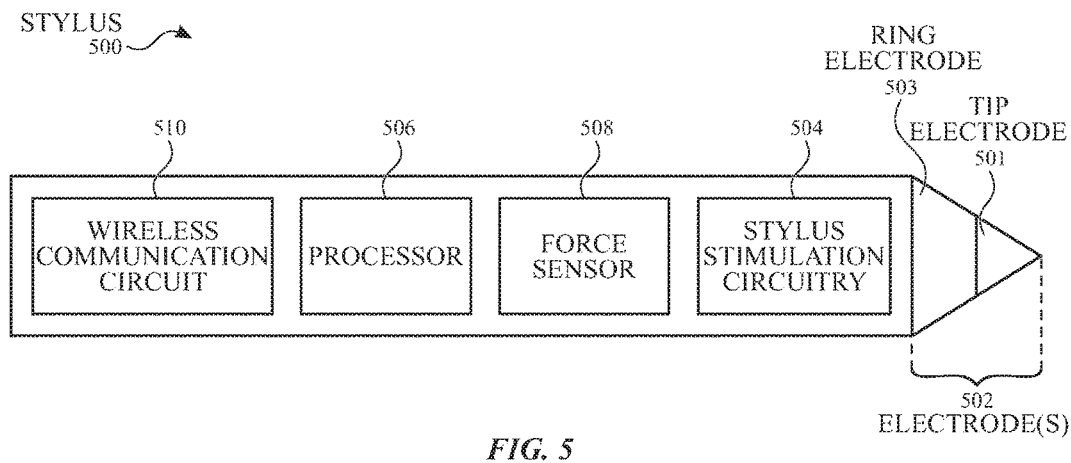
FIG. 5 illustrates an example active stylus according to examples of the disclosure.

As described herein, in addition to performing touch scans to detect an object such as a finger or a passive stylus, computing system 200 can also perform stylus scans to detect an active stylus and can communicate with a stylus. For example, an active stylus can be used as an input device on the surface of a touch screen of touch-sensitive device. FIG. 5 illustrates an example active stylus according to examples of the disclosure. Stylus 500 can include one or more electrodes 502, which can be located, for example, at a distal end of the stylus (e.g., the tip of the stylus). As illustrated in FIG. 5, stylus 500 can include a tip electrode 501 and a ring electrode 503. Tip electrode 501 can include a material capable of transmitting the stylus stimulation signal from stylus stimulation circuitry 504 to the touch-sensitive device, such as a flexible conductor, a metal, a conductor wrapped by a non-conductor, a non-conductor coated with a metal, a transparent conducting material (e.g., indium tin oxide (ITO)) or a transparent non-conductive material (e.g., glass) coated with a transparent (e.g., ITO) (if the tip is also used for projection purposes) or opaque material, or the like. In some examples, the stylus tip can have a diameter of 2 mm or less. In some examples, the stylus tip can have a diameter between 1 mm and 2 mm. Ring electrode 503 can include a conductive material, such as a flexible conductor, a metal, a conductor wrapped by a non-conductor, a non-conductor coated with a metal, a transparent conducting material (e.g., ITO) or a transparent non-conductive material (e.g., glass) coated with a transparent (e.g., ITO if the tip is used for projection purposes) or opaque material, or the like.

Stylus 500 can also include stylus stimulation circuitry 504. Stylus stimulation circuitry 504 can be configured to generate one or more stylus stimulation signals at the one or more electrodes 502 to stimulate a touch-sensitive device. For example, stylus stimulation signals can be coupled from stylus 500 to the touch sensing circuitry of touch screen 220, and the received signals can be processed by the touch ASIC 201. The received signals can be used to determine a location of active stylus 500 at the surface of touch screen 220.

The operation of stylus stimulation circuitry 504 can be controlled by a processor 506. For example, the processor can be configured to communicate with the stylus stimulation circuitry to control the generation of stimulation signals. In some examples, the communication between the processor and stylus stimulation circuitry can be accomplished via an SPI bus, and the stylus stimulation circuitry can operate as an SPI slave device. In some examples, the stylus 500 can include more than one processor, and stylus stimulation circuitry 504 can include one or more processors. In some examples, one or more of the stylus functions described herein can be performed by firmware stored in memory or in program storage (not shown) and executed by processor 506 or a processor in stylus stimulation circuitry 504.

In some examples, stylus 500 can also include a force sensor 508 to detect the amount of force at the tip of the stylus 500. For example, when the stylus tip is touching touch screen 220, the force sensor 508 can measure the force at the stylus tip. The force information can be stored in the stylus (e.g., in a memory (not shown)) and/or transmitted (via a wired connection or wirelessly) to the computing system 200. For example, the force information can be communicated to host processor 228 or touch ASIC 201 in computing system 200. Force information and corresponding location information can be processed together by host processor 228 and/or touch ASIC 201.

In some examples, force sensor 508 can be coupled to processor 506. Processor 506 can process force information from force sensor 508 and, based on the force information, control stylus stimulation circuitry 504 to generate or not generate stylus stimulation signals. For example, the processor can cause stylus stimulation circuitry 504 to generate no stylus stimulation signals when no force is detected or when the force is below a threshold level. When a force (or a force at or above the threshold level) is detected (e.g., corresponding to touch-down of the stylus), the processor can cause stylus stimulation circuitry 504 to generate stylus stimulation signals and continue generating stylus stimulation signals until the detected force drops below the threshold level (or some other threshold level).

Stylus 500 can also include a wireless communication circuit 510, although in some examples the wireless communication functionality can be incorporated into other modules within the stylus 500, and in other examples the stylus can communicate via a wired connection. Wireless communication circuit 510 can transmit the force information from the stylus 500 to the wireless communication circuitry of computing system 200. The wireless communication circuit 510 can also receive other information including, but not limited to, information about stylus stimulus frequencies, scan plan information (i.e., the sequence of scans to be performed by the touch-sensitive device) and clock synchronization information. For example, the touch-sensitive device can transmit one or more low noise frequencies to the stylus 500, and stylus stimulation circuitry 504 can generate stimulation signals at electrodes 502 based on, or at, the one or more low noise frequencies. In some examples, the stylus stimulation circuitry 504 can generate stimulation signals at two or more different frequencies (e.g., at one frequency at the ring electrode and at a second frequency at the tip electrode), though in other examples, stimulation signals are only generated by the stylus at one frequency. In some examples, information, such as information about stylus stimulation frequencies and scan event plans, can be transmitted from touch ASIC 201 to the wireless communication unit of computing system 200 via host processor 228. In other examples, information, such as clock synchronization information, can be communicated directly from touch ASIC 201 to wireless communication unit of computing system 200.

In some examples, stylus 500 can operate asynchronously from the computing system 200. In an asynchronous example, the stylus can continuously generate stimulation signals, generate stimulation signals at various intervals, or generate stimulation signals when force is detected by the force sensor 508. In other examples, wireless communication can be used to synchronize the stylus 500 and computing system 200. For example, the stylus 500 can receive clock synchronization information and scan plans from computing system 200 such that it can generate stimulation signals when the computing system expects such stimulation signals from the stylus. For example, the clock synchronization information can provide an updated value for the stylus clock (e.g., a timer, counter, etc.) or reset the stylus clock so that the stylus clock can be substantially the same as (or otherwise track) a system clock for the touch-sensitive device. The stylus can then use the scan plan, which can define the sequence of scan events to be performed by the touch-sensitive device at specific times, and the stylus clock to determine when the touch-sensitive device expects stylus stimulation signals to be generated. When the computing system 200 is not expecting stylus stimulation signals, the stylus can stop generating stimulation signals. Additionally, in some examples, the computing system 200 and stylus 500 can synchronize their communication to regular time intervals such that both the computing system 200 and stylus 500 can save power. For example, after the stylus and computing system pair via a wireless communication channel, the communication between the stylus and computing system can occur only at specified times (based on their respective synchronized clocks). Stylus 500 and/or computing system 200 can include one or more crystals to generate stable and accurate clock signals to improve synchronization and reduce drift between the computing system and stylus clocks.

Figure 6:
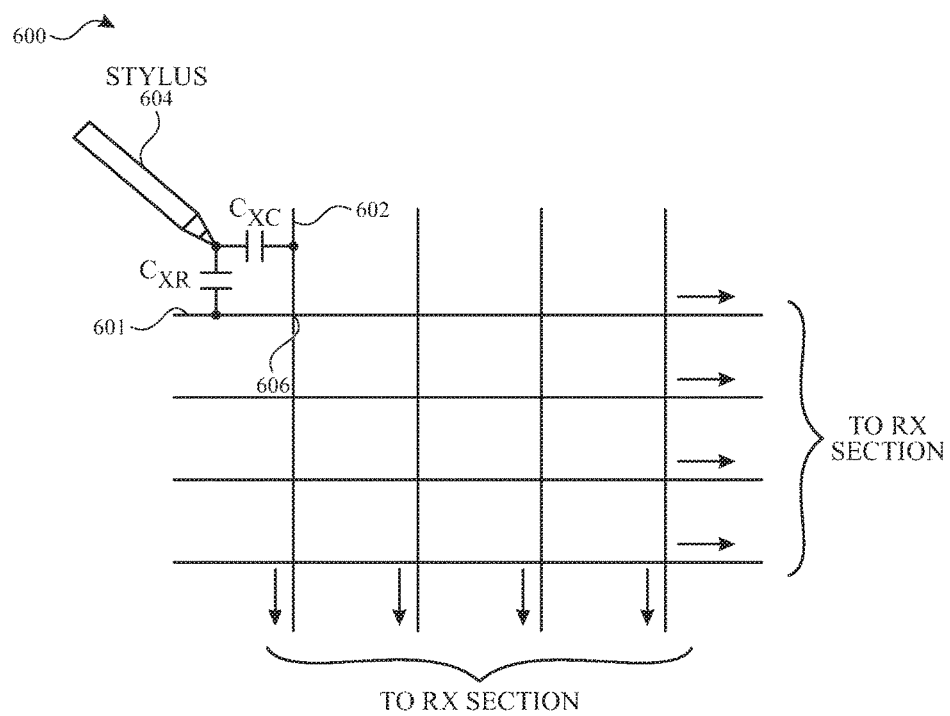
FIG. 6 illustrates an example touch sensor panel configuration operable with the touch ASIC of FIG. 2 to perform a stylus scan according to examples of the disclosure.

FIG. 6 illustrates an example touch sensor panel configuration operable with the touch ASIC of FIG. 2 to perform a stylus scan according to examples of the disclosure. During a stylus scan, one or more stimulation signals can be injected by stylus 604 proximate to one or more touch nodes 606. The stimulation signals injected by stylus 604 can create capacitive coupling Cxr between the stylus 604 and one or more row traces 601 and capacitive coupling Cxc between the stylus 604 and one or more column traces 602 corresponding to the one or more proximate touch nodes 606. The capacitive coupling Cxr and Cxc between the stylus 604 and the one or more touch nodes 606 can vary based on the proximity of stylus 604 to the one or more touch nodes 606. During the stylus scan, the transmit circuitry 214 can be disabled, i.e., no stimulation signals Vstim from the touch controller are sent to touch sensor panel 600. The capacitive coupling (e.g., mutual capacitance) can be received by the receive circuitry 208 from the row and column traces of the one or more touch nodes 606 for processing. As described herein, in some examples the one or more stylus stimulation signals can have one or more frequencies. The one or more frequencies can be selected by the touch ASIC 201 using information from a stylus spectral analysis scan (described below in more detail). This frequency information can be wirelessly communicated to the stylus 604 so that the stylus 604 can generate stimulation signals at the appropriate frequencies.

In some examples, one or more multiplexers can be used to couple row and/or column electrodes to the receive circuitry and/or transmit circuitry. For example, during a mutual capacitance touch sensing scan, row traces can be coupled to the transmit circuitry and column traces can be coupled to the receive circuitry. During a stylus sensing scan, column traces (or row traces) can be coupled via the one or more multiplexers to the receive circuitry to detect input from a stylus or other input device along one axis of the touch screen, and then the row traces (or column traces) can be coupled via the one or more multiplexers to the receive circuitry to detect input from a stylus or other input device along a second axis of the touch screen. In some examples, the row and column traces can be sensed simultaneously (i.e., both row and column traces concurrently coupled to the receive circuitry). In some examples, the stylus can be detected on the column traces concurrently with the mutual capacitance scan touch sensing scan. The touch and stylus signals can be differentiated by filtering and demodulating the received response signals at different frequencies.

Figure 7:
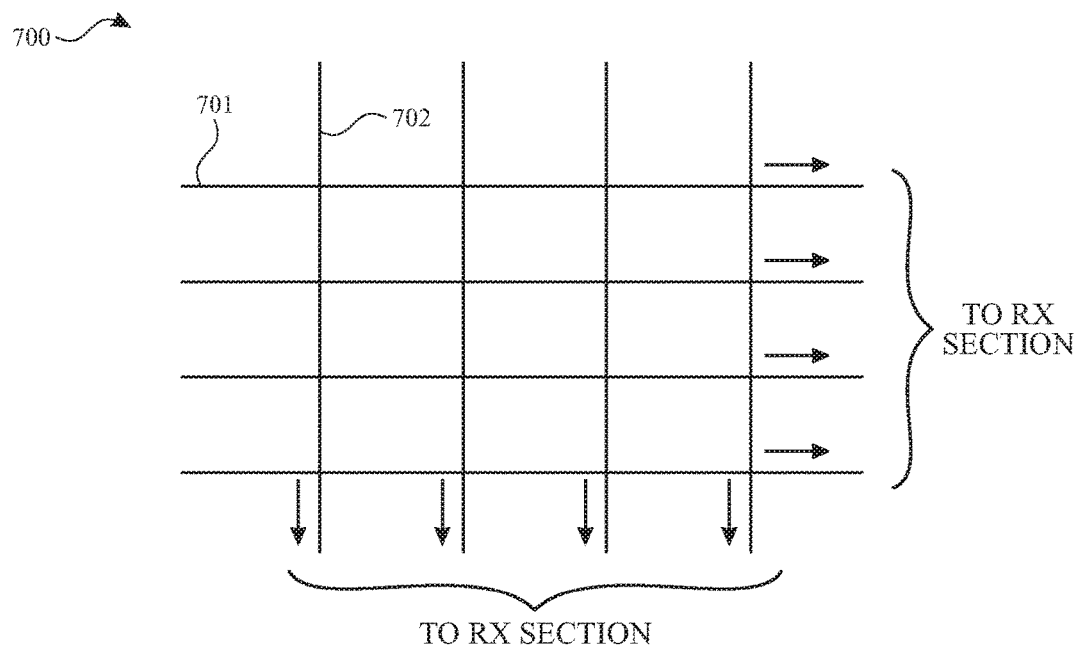
FIG. 7 illustrates an example touch sensor panel configuration operable with the touch ASIC of FIG. 2 to perform a stylus spectral analysis scan according to examples of the disclosure.

FIG. 7 illustrates an example touch sensor panel configuration operable with the touch ASIC of FIG. 2 to perform a stylus spectral analysis scan according to examples of the disclosure. During a stylus spectral analysis scan or a touch spectral analysis scan, the transmit circuitry 214 can be disabled, i.e., no stimulation signals Vstim are sent to touch sensor panel 700, while some or all of the row traces 701 and column traces 702 can be coupled to the receive circuitry 208. The receive circuitry 208 can receive and process touch signals from some or all of the rows and columns of the touch sensor panel 700 in order to determine one or more low noise frequencies for use during subsequent touch and/or stylus scans.

When the stylus 500 first connects or reconnects wirelessly to the computing system 200 it can receive frequency information from the computing system 200. A stylus spectral analysis scan can determine one or more clean frequencies for the stylus to use to generate one or more stimulation signals. The computing system 200 and stylus 500 can communicate (including, for example, performing a handshake between the two devices) and computing system 200 can transmit the frequency information to the stylus 500 such that the stylus knows the appropriate one or more frequencies to use to generate one or more stimulation signals.

The stylus 500 can change at least one stimulation frequency as a result of a stylus spectral analysis scan. In a synchronous system, a stylus spectral analysis scan can execute while the stylus 500 is predicted to not be generating a stimulation signal, e.g., when a stylus scan is not executing. After completing the stylus spectral analysis scan, the frequency information can be communicated wirelessly to stylus 500 and the communication can cause the stylus 500 to change the one or more stimulation frequencies. The computing system 200 can then switch the one or more frequencies used for demodulating stylus scan events when the stylus 500 has switched frequencies.

In other examples, stylus 500 can be asynchronous such that the stylus 500 can generate one or more stimulation signals at one or more stimulation frequencies irrespective of the timing of the stylus scan event. As a result, the stylus 500 can be stimulating the touch sensor panel during the stylus spectral analysis scan. The asynchronous stylus stimulation signals can cause the computing system to detect a signal when demodulating at the frequency of stimulation, which can be interpreted as noise at that frequency and trigger a frequency switch. In order to prevent triggering an unnecessary frequency switch, the computing system 200 can assume that stylus lift-off will eventually occur and wait until lift-off to initiate a stylus spectral analysis scan. The computing system 200 can predict a lift-off condition using the results of other scans, e.g., stylus scans, or stylus force information to predict that the stylus is not on the panel, and then perform a stylus spectral analysis scan.

As discussed above with reference to FIG. 5, an example stylus can include a tip electrode including a conductor wrapped by a non-conductor (e.g., a metal electrode coated with a plastic). A stylus tip formed of a non-conductive material such as plastic (and in some cases including an outer coating of paint) can wear down with time. Wear spots can interfere with accurate stylus location detection, and paint wear can be aesthetically unpleasing. Additionally, wear can expose a metal tip electrode that can scratch the touch screen. In some cases, the stylus can be designed with a removable tip portion, so that the stylus tip portion can be replaced due to wear without replacing the entire stylus device. Additionally, a removable stylus tip can enable a user to replace the tip portion with other tip portions that can provide a different feel or function, such as a brush tip or a different diameter tip, instead of requiring a plurality of different complete stylus devices.

Figure 8:
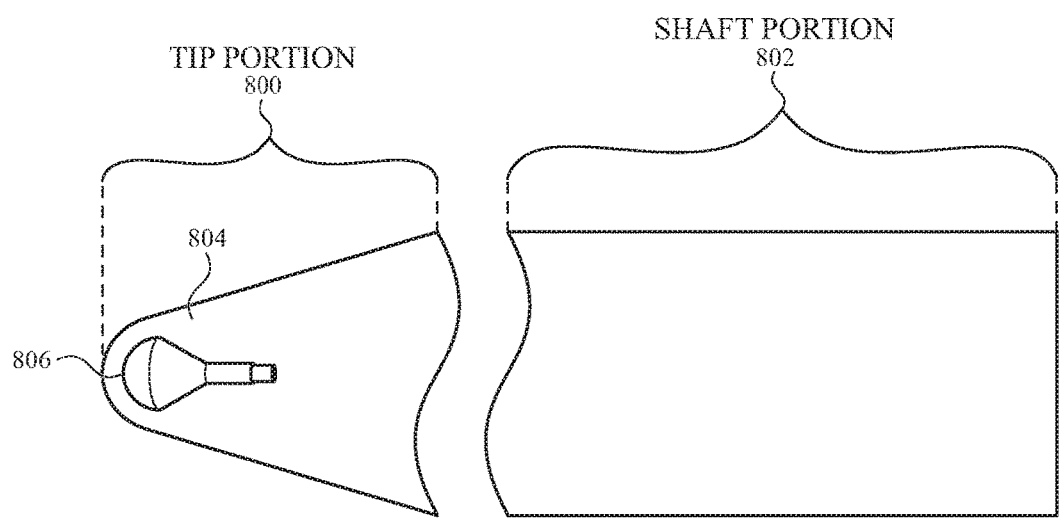
FIG. 8 illustrates an example stylus including a removable stylus tip according to examples of the disclosure.

FIG. 8 illustrates an example stylus including a removable stylus tip according to examples of the disclosure. The example stylus can include a shaft portion 802 and a removable tip portion 800. The removable tip portion 800 and shaft portion 802 can be coupled together with a connector (not shown). For example, the connector can be a threaded screw-type connector, plug-in connector, or the like. In some examples, a locking or fastening system between the removable stylus tip portion 800 and shaft portion 802 can include a fastening bar, spring fastener and a release button. The removable tip 800 can include a tip electrode 806 formed from a conductive material, such as a metal, alloy, conductive plastic, or other suitable material. The removable tip can also include a non-conductive material 804, such as non-conductive plastic, around at least part of the conductive stylus tip electrode 806. For example, the non-conductive material 804 can border some or all of the spherical portion of tip electrode 806. The non-conductive plastic or other material can be flexible and soft so as to limit or prevent scratching of a touch screen of a touch-sensitive device. The non-conductive plastic can also be selected to have a dielectric constant that can enhance or focus or shape the electric field formed between the tip electrode and the sensors of a touch-sensitive device, or otherwise limit the attenuation of the electric field. In some examples, the tip electrode 806 can be press-fit into an opening in the non-conductive material 804. In other examples, the tip electrode 806 can be over-molded with non-conductive material 804 forming the stylus tip portion.

As discussed above, wear of the stylus tip can degrade stylus performance and result in damage to the touch screen on which the stylus is used. In some examples, a visual indicator can be used to ensure proper performance and/or prevent damage to the touch screen by a worn tip. For example, the stylus tip can include an internal layer (e.g., of a different color) that when exposed can indicate to the user to replace the tip. Additionally or alternatively, in some examples, the appearance of observable wobble (or an increase in wobble) can indicate to the user to replace the tip. Additionally or alternatively, in other examples, to ensure proper stylus performance and/or prevent damaging the touch screen with the stylus, stylus use or wear can be tracked (e.g. tracking one or more parameters) and used to inform a user when to replace the stylus tip. The details of these various indicators will be described in more detail below.

Figure 9:
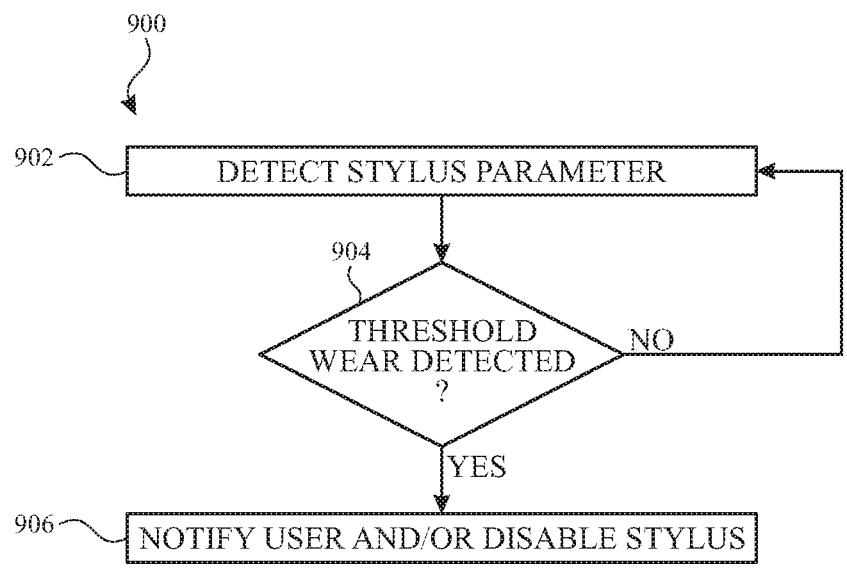
FIG. 9 illustrates an example process for tracking one or more stylus parameters and using stylus wear to indicate to a user to replace the stylus tip according to examples of the disclosure.

FIG. 9 illustrates an example process 900 for tracking one or more stylus parameters and using stylus wear to indicate to a user to replace the stylus tip according to examples of the disclosure. At 902, one or more parameters associated with the stylus can be detected. In some examples, the one or more parameters can include a total signal level of the stylus detected by a touch-sensitive device. In some examples, the one or more parameters can include a parameter measuring the total distance traversed by the stylus on the surface of the touch-sensitive device. At 904, the one or more parameters detected at 902 can be used to determine whether a threshold level of wear is detected. At 906, when a threshold level of wear is detected, a user can be notified to replace the stylus tip and/or the stylus functionality can be disabled. When a threshold level of wear is not detected, the one or more stylus parameters can continue to be monitored (without notification or disabling the stylus functionality).

The parameter tracking described with reference to FIG. 9 can, in some examples, be performed continually (e.g., detecting the one or more parameters each sensing frame). In some examples, the parameter tracking can be performed periodically (e.g., once per minute, once per hour, once per day, once per month, etc.), intermittently, or according to one or more detected conditions (e.g., only when the stylus is detected). In some examples, the frequency of parameter tracking can depend on the proximity to the wear threshold. For examples, the parameter tracking can occur more frequently as the wear level indicated by the parameter tracking approaches the wear threshold.

Figure 10A:
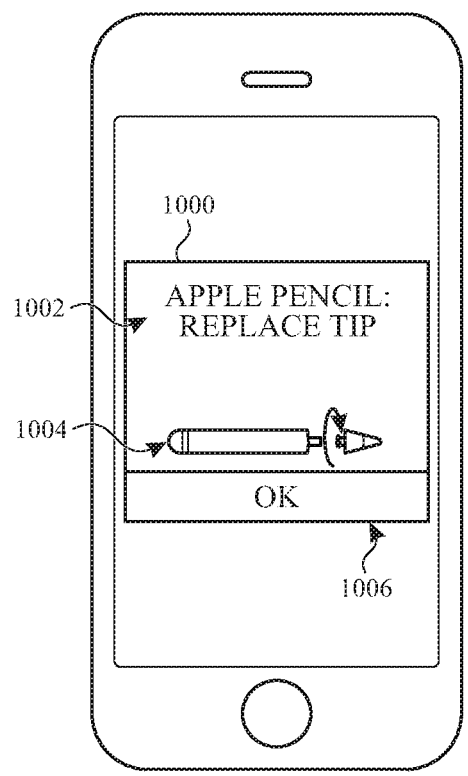
FIGS. 10A and 10B illustrate example notifications that can be displayed on the screen of a touch-sensitive device based on the parameter tracking according to examples of the disclosure.
Figure 10B:
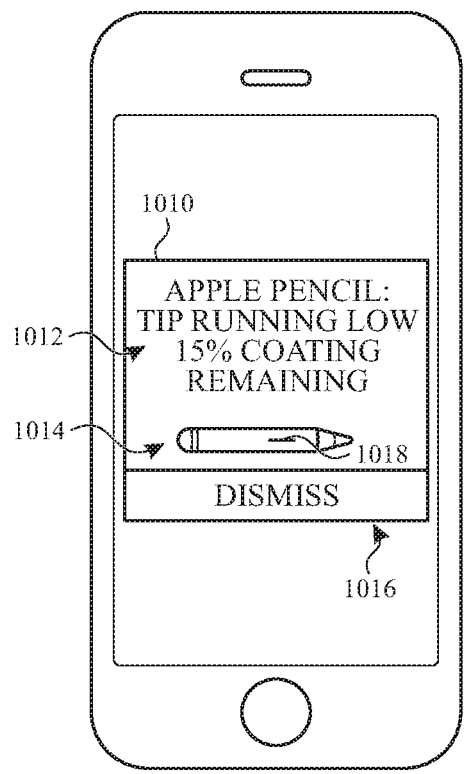

FIGS. 10A and 10B illustrate example notifications that can be displayed on the screen of a touch-sensitive device based on the parameter tracking according to examples of the disclosure. FIG. 10A illustrates a pop-up notification 1000 displayed on a touch screen according to examples of the disclosure. The notification 1000, for example, can include text instructions 1002 to replace the stylus tip and/or indicate that the stylus is disabled. In some examples, the notification 1000 can include a graphical indicator 1004 in addition to or instead of the text instructions. Although FIG. 10A illustrates a pop-up notification 1000, other notifications can be employed in addition to or in place of the pop-up notification (e.g., an icon, badge, etc.). Additionally or alternatively, an audio or haptic output can be used as an indicator and may continue even after the notification is removed from the display if the stylus continues to be used without replacing the tip.

Additionally or alternatively to displaying a notification, the stylus input functionality at the touch-sensitive device can be disabled. In some examples, when the touch screen device determines that the stylus tip should be replaced, the touch screen device can communicate with the stylus (e.g., via a wired or wireless connection) to stop generating stimulation signals at the stylus. In some examples, the stylus can continue generating stimulation signals as under normal operating conditions, but the touch screen device can disable stylus detection (e.g., disable stylus scan and/or power down circuitry used for detecting the stylus). In some examples, the stylus stimulation and detection can continue, but detected stylus input of the disabled stylus device is ignored (e.g., not stored in memory or ignored by a processor of the touch screen device) until the parameters (or user input) indicate that stylus tip has been replaced. Although stylus input functionality may be disabled due to wear of the particular stylus, inputs from other sensed touch objects such as fingers or other active styli can continue to be used to operate the touch screen device.

Notification 1000 can also include one or more graphical elements in or proximate to notification 1000 for accepting input. For example, FIG. 10A illustrates a virtual button 1006 including an "OK" textual message. Activating the virtual button 1006 can close notification 1000 so that a user can continue to interact with the touch screen. In examples where the stylus is disabled due to wear, activating the virtual button can be in response to a tap input from an object other that the disabled stylus. Although a virtual button is displayed, the notification may include any type of affordance to accept input (e.g., virtual buttons, menus, selectors, switches, sliders, scrubbers, knobs, thumbnails, links, icons, radial buttons, checkboxes and any other mechanism for receiving input from a user). In some examples, the notification can include a graphical element that when activated verifies that a stylus tip has been replaced. For example, a virtual button (e.g., including a "Verify New Tip" textual message) can be activated, and in response, the touch screen device can verify that the stylus tip has been replaced and/or that the new tip meets a performance criteria (e.g., based on the total signal level). Once verification is completed, the notification can be removed from the display.

In some examples, rather than abruptly halting stylus functionality when the threshold tip wear is detected, notifications can be provided in advance of disabling the stylus input functionality. FIG. 10B illustrates a pop-up notification 1010 displayed on a touch screen according to examples of the disclosure. The notification 1010, for example, can include textual warning 1012 regarding the stylus tip wear level. The warning can include a quantitative indication of the tip wear level (e.g., 15% of coating remaining). One or more warning notifications can be generated (e.g., at 15%, 10% and 5%) as detected wear exceeds different thresholds. In some examples, the notification can include a graphical indicator 1014 of the tip wear level, e.g., as illustrated by element 1018, in addition to or instead of the text instructions (e.g., similar to ink levels visible in a ballpoint pen with a transparent or translucent shaft). The ratio of length of element 1018 as compared with the length of the shaft of the illustrated stylus can correspond to a percentage of coating remaining. In some examples, element 1018 can change colors depending on the percentage (e.g., from orange at 15% to red at 10% to dark red at 5%). Although FIG. 10B illustrates a pop-up notification 1010, other notifications can be employed in addition to or in place of the pop-up notification (e.g., an icon, badge, etc.). Additionally or alternatively, an audio or haptic output can be used as an indicator.

Notification 1010 can also include one or more graphical elements in or proximate to notification 1010. For example, FIG. 10B illustrates a virtual button 1016 including a "DISMISS" textual message. Activating the virtual button 1016 can close notification 1010 so that a user can continue to interact with the touch screen. Although a virtual button is displayed, the notification may include any type of affordance to accept input (e.g., virtual buttons, menus, selectors, switches, sliders, scrubbers, knobs, thumbnails, links, icons, radial buttons, checkboxes and any other mechanism for receiving input from a user). In some examples, the notification 1010 can include a graphical element that when activated verifies that a stylus tip has been replaced as discussed above with reference to FIG. 10A.

In some examples, hysteresis can be employed to avoid prematurely presenting and/or prevent continuously presenting notification 1000 and/or notification 1010 when the wear level detected is proximate to a threshold level. For example, hysteresis can be used to avoid continuously presenting a user with warning notifications described above with respect to FIG. 10B when the tracked wear level is close to one or more warning thresholds.

Figure 11A:
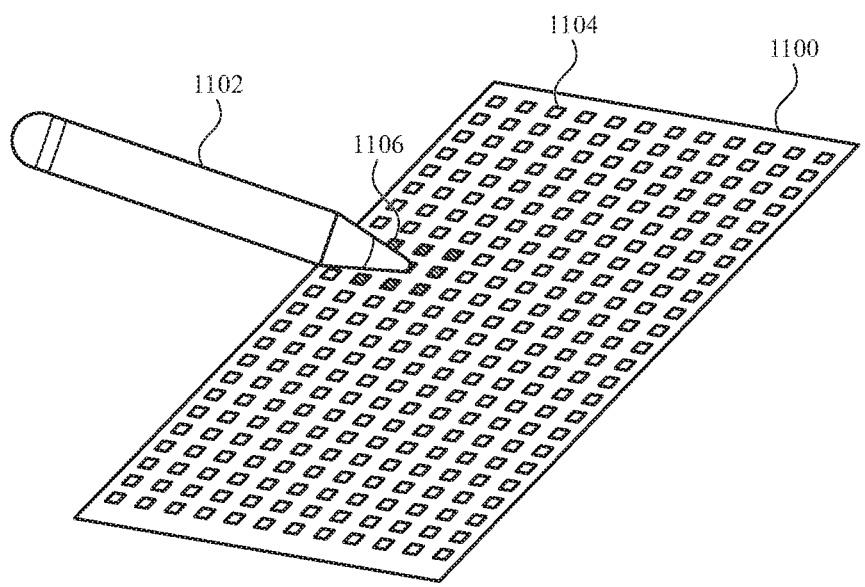
FIG. 11A illustrates an example touch sensor panel including sense nodes receiving signals from an active stylus according to examples of the disclosure.

In some examples, signals received at the touch-sensitive device from the active stylus can be used to monitor wear of a stylus tip. For example, the touch-sensitive device can track a parameter representative of the total signal corresponding to the stylus received by the touch-sensitive device. FIG. 11A illustrates an example touch sensor panel including sense nodes receiving signals from an active stylus according to examples of the disclosure. Example touch sensor panel 1100 can include a plurality of sensing nodes 1104 (e.g., mutual or self-capacitance sensing nodes as described above). When active stylus 1102 comes into contact or proximity with touch sensor panel 1100, sensing nodes can receive signals from active stylus 1102. One or more sensing nodes 1106 (shaded in FIG. 11A) closest to active stylus 1102 can detect signal(s) corresponding to the stylus. FIG. 11A illustrates a 3×3 selection of sensing nodes 1106 (e.g., centered on the sensing electrode receiving the maximum signal corresponding to the stylus) to detect most of or all of the signal(s) received in response to the presence of active stylus 1102. Although a 3×3 selection is illustrated in FIG. 11A, more or fewer electrodes can be used depending on the stylus or touch sensor panel characteristics. Parameter $Z_{TOT}$ can be generated by summing the signal received at sensing nodes 1106. $Z_{TOT}$ can be representative of the total signal received at the touch-sensitive device from the active stylus. In some examples, rather than summing the signal received at multiple sensing electrodes, the tracked parameter can be a maximum signal corresponding to the stylus (i.e., corresponding to using the signal from only the sensing node receiving the maximum signal from the stylus to represent the total signal from the stylus).

Figure 11B:
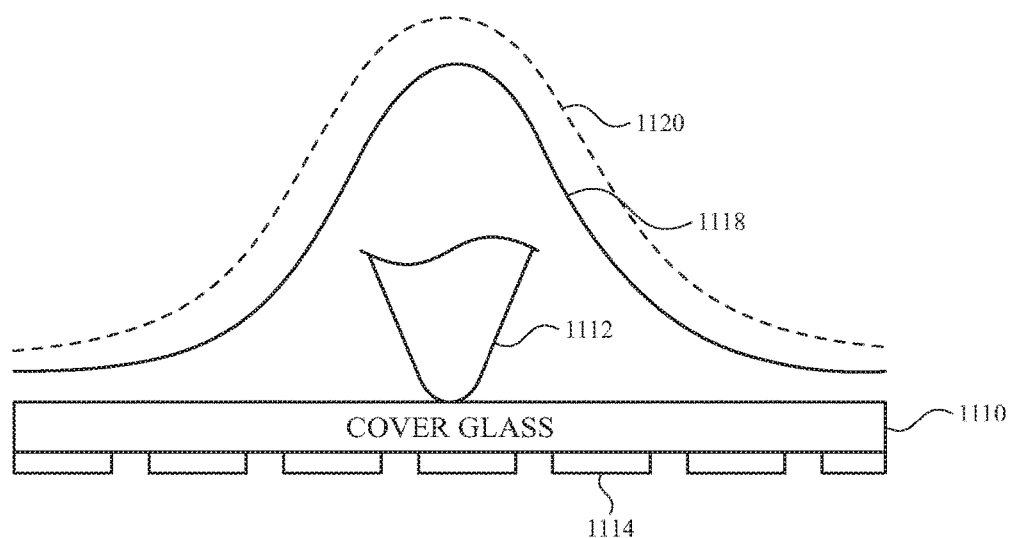
FIG. 11B illustrates a side view of an example touch screen including sense nodes receiving signals from an active stylus according to examples of the disclosure.

FIG. 11B illustrates a side view of an example touch screen including sense nodes receiving signals from an active stylus according to examples of the disclosure. The touch screen can include a cover glass 1110 (or other material forming the outer surface of the touch screen) and sensing nodes 1114. When tip 1112 of an active stylus is touching or proximate to the touch screen, coupling between tip 1112 and sensing nodes 1114 can be detected. The sensing nodes 1114 can receive signals, represented by signal profile 1118, corresponding to the coupling between the tip 1112 and respective sensing nodes 1114. The amount of signal received at the respective sensing nodes can depend on the signal profile for the stylus tip and touch-sensitive device being used. The signal profile can depend on various characteristics of the stylus and the touch screen, including but not limited to, the geometry and materials used for the stylus tip portion (e.g., electrode and coating), the geometry, material and spacing of the sensing nodes of the touch sensor panel.

The number of electrodes used to generate $Z_{TOT}$ can depend on the signal profile for the stylus and touch-sensitive device. For example, in some examples, three sensing nodes in the x and y dimensions can capture a threshold amount of the stylus signal (e.g., 95% of the total stylus signal). In examples with a narrower profile, fewer sensing nodes can be used to generate $Z_{TOT}$ (even a single sensing node in some examples). In examples with a wider profile, more sensing nodes can be used to generate $Z_{TOT}$.

As illustrated in FIG. 11B, signal profile 1118 can correspond to a stylus with an unworn tip. As the tip begins to wear, however, the distance between the stylus tip electrode and the sensing nodes of the touch screen can decrease. Signal profile 1120, having, for example, a larger amplitude than signal profile 1118, can correspond to the stylus with a worn tip. The $Z_{TOT}$ parameter generated by the touch-sensitive device for the stylus with the worn tip can increase as well. The changes in $Z_{TOT}$ can be used to monitor the wear and determine when the stylus tip portion (or the entire stylus) should be replaced.

Figure 12:
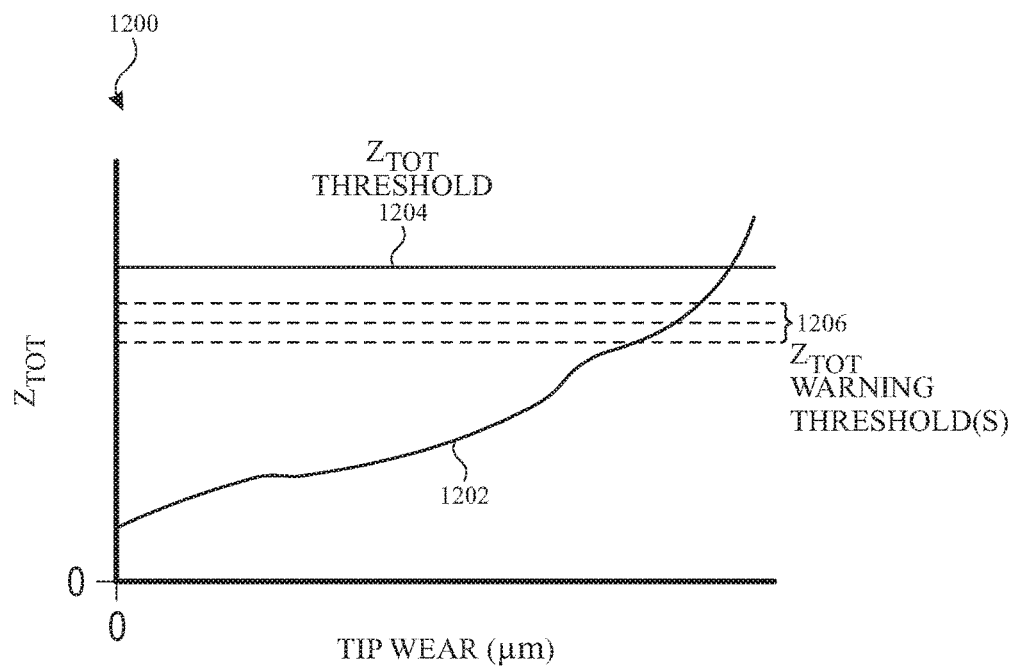
FIG. 12 illustrates an example plot of the relationship between total signal detected from the stylus and tip wear according to examples of the disclosure.

Estimating the amount of tip wear and determining when the stylus tip should be replaced can be performed by comparing $Z_{TOT}$ with one or more thresholds. For example, a correspondence relationship can be determined between $Z_{TOT}$ and an amount of tip wear based on empirical study. Thus, generating $Z_{TOT}$ can provide an indication of wear level of the stylus tip, and when one or more threshold levels of wear are exceeded, the touch-sensitive device can generate one or more notifications and/or disable the stylus. FIG. 12 illustrates an example plot of the relationship between total signal detected from the stylus and tip wear according to examples of the disclosure. The y-axis of plot 1200 corresponds to $Z_{TOT}$ measured by the touch-sensitive device. The x-axis of plot 1200 corresponds to the tip wear (e.g., measured in μm) of the stylus tip portion. Curve 1202 can represent the relationship between the tip wear and $Z_{TOT}$ as measured by the touch-sensitive device. In some examples, curve 1202 can be linear and in other examples curve 1202 can be non-linear.

Plot 1200 of FIG. 12 illustrates $Z_{TOT}$ thresholds that can be applied to the $Z_{TOT}$ measured by the touch-sensitive device. For example, in some examples, when $Z_{TOT}$ exceeds $Z_{TOT}$ threshold 1204, a notification can be displayed (e.g., as in FIG. 10A) and/or the stylus functionality can be disabled. In some examples, one or more additional $Z_{TOT}$ thresholds 1206 can be used to provide for the display of warning notifications (e.g., as in FIG. 10B). For example, FIG. 12 illustrates three $Z_{TOT}$ thresholds 1206 which can correspond, for example, to 15%, 10% and 5% tip coating remaining, respectively. In some examples, $Z_{TOT}$ threshold 1204 can be set at a $Z_{TOT}$ value corresponding to zero coating (i.e., exposed metal tip electrode) with some margin included to prevent scratching of a touch screen (and/or to account for manufacturing tolerances). This $Z_{TOT}$ value can represent a minimum coating requirement. The additional $Z_{TOT}$ thresholds 1206 can be determined based off of the starting coating thickness for the new stylus tip and the minimum coating.

In some examples, empirical study of the relationship between $Z_{TOT}$ and tip wear for a given touch screen device and stylus type can be used to determine a corresponding minimum coating and/or $Z_{TOT}$ threshold that can be applied for monitoring wear when using that type of touch screen device and stylus. The minimum coating and/or $Z_{TOT}$ threshold can be stored in the touch-sensitive device at factory calibration for use in wear monitoring. In some examples, the touch-sensitive device can be compatible with different types of styli, and empirical study for each stylus type can be performed to determine corresponding minimum coatings and/or $Z_{TOT}$ thresholds. The minimum coatings and/or $Z_{TOT}$ thresholds can be stored in the touch-sensitive device (e.g., at factory calibration). At the time of pairing between the touch-sensitive device and a particular stylus, the appropriate corresponding $Z_{TOT}$ threshold can be chosen from among the stored $Z_{TOT}$ thresholds. In some examples, rather than using a constant threshold for all styli of a given type and all touch-sensitive devices of a given type, the empirically determined $Z_{TOT}$ threshold(s) can be modified to account for differences in manufacturing of the particular touch-sensitive device and/or stylus. For example, the $Z_{TOT}$ threshold(s) can be scaled up or down based on parameters of the specific device after manufacturing. Additionally, in some examples, the $Z_{TOT}$ threshold can also be adjusted according to other parameters detected during operation. For example, due to the geometry of the stylus tip and tip electrode, the $Z_{TOT}$ measured during operation can be dependent on the orientation of the stylus. A stylus with an unworn tip oriented with a 0° tilt angle (i.e., perpendicular with the touch screen surface) can have a reduced $Z_{TOT}$ measured by the touch-sensitive device as compared with the same stylus at a 70° tilt angle (i.e., with respect to the line perpendicular to the touch screen surface). To account for these differences, the $Z_{TOT}$ threshold can dependent on tilt angle of the stylus (e.g., as determined by the stylus and/or the touch screen device).

Figure 13:
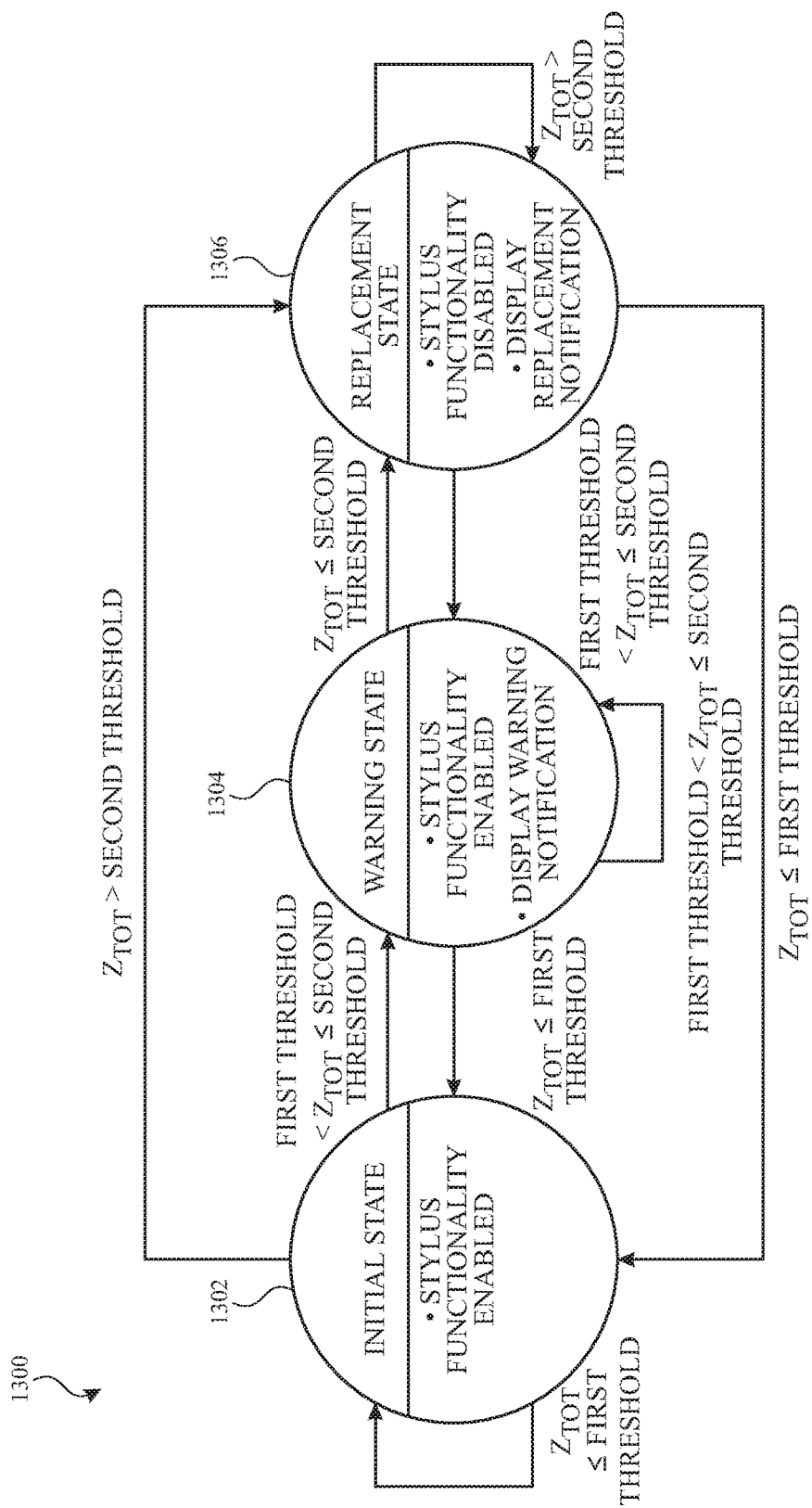
FIG. 13 illustrates an example state diagram for wear tracking according to examples of the disclosure.

FIG. 13 illustrates an example state diagram for wear tracking according to examples of the disclosure. State diagram 1300 can include an initial state 1302, a warning state 1304 and a replacement state 1306. It is to be understood that in some examples, the state diagram can include a plurality of warning states or, alternatively, the warning state can be omitted. The initial state 1302 can be a default state and can correspond to a stylus tip with little or no wear (i.e., not enough wear to trigger a transition to the warning state and/or replacement state). In the initial state 1302, the stylus input functionality is enabled for the touch-sensitive device. When in the initial state 1302, as long as $Z_{TOT}$ does not exceed a first threshold, the system can remain in the initial state 1302. When in the initial state 1302 and when $Z_{TOT}$ exceeds the first threshold, but not a second, larger threshold, the system can transition from initial state 1302 to warning state 1304. When in the initial state 1302 and when $Z_{TOT}$ exceeds the second, larger threshold, the system can transition from initial state 1302 to replacement state 1306.

In the warning state 1304, the stylus input functionality can be enabled or can remain enabled (e.g., depending on the direction of the transition). Upon transitioning into the warning state 1304, the system can cause a warning notification to be displayed on the touch screen. When in the warning state 1304, as long as $Z_{TOT}$ exceeds the first threshold but not the second threshold, the system can remain in the warning state 1304. When in the warning state 1304 and when $Z_{TOT}$ exceeds the second threshold, the system can transition from warning state 1304 to the replacement state 1306. When in the warning state 1304 and when $Z_{TOT}$ no longer exceeds the first threshold, the system can transition to the initial state 1302 from the warning state 1304.

In the replacement state 1306, the stylus functionality can be disabled. Upon transitioning into the replacement state 1306, the system can cause a notification to be displayed on the touch screen instructing the user to replace the stylus tip. When in the replacement state 1306, as long as $Z_{TOT}$ exceeds the second threshold, the system can remain in the replacement state 1306. When in the replacement state 1306 and when $Z_{TOT}$ exceeds the first threshold but no longer exceeds the second threshold, the system can transition to the warning state 1304 from the replacement state 1306. When in the replacement state 1306 and when $Z_{TOT}$ no longer exceeds the first threshold, the system can transition to the initial state 1302 from the replacement state 1306.

As described with reference to FIG. 13, in some examples the transitions between states can occur based on a single $Z_{TOT}$ measurement that triggers one of the $Z_{TOT}$ thresholds. In some examples, to reduce the number of transitions and to avoid false positive transitions, additional conditions or hysteresis can be required to transition between states. For example, one or more of the transition conditions illustrated in FIG. 13 can require a threshold number of triggers before transitioning. The threshold number of triggers can be different or the same for each of the transitions. For example, in order to transition from initial state 1302 to the warning state 1304, $Z_{TOT}$ can be required to exceed the first threshold n times. In order to transition from the warning state 1304 to the replacement state 1306, $Z_{TOT}$ can be required to exceed the second threshold m times. In some examples, one or more of the transition conditions illustrated in FIG. 13 can require a threshold number of triggers within a threshold period of time before transitioning. The threshold number of triggers and the threshold period of time can be different or the same for each of the transitions. For example, to transition from the initial state 1302 to the replacement state 1306, $Z_{TOT}$ can be required to exceed the second threshold x times within period of time y. In some cases, the allotted period of time can require z consecutive triggers. In some examples, to avoid false positives to trigger transitions, rather than using $Z_{TOT}$ alone as the triggering parameter, a history of $Z_{TOT}$ measurements can be used. For example, a history of $Z_{TOT}$ values (e.g., an average or other weighted combination of the last five or ten $Z_{TOT}$ values) can be used. The $Z_{TOT}$ parameter generated from the history of $Z_{TOT}$ values can be compared with the $Z_{TOT}$ threshold(s) to determine when to transition between states.

Although the state diagram of FIG. 13 uses the same $Z_{TOT}$ thresholds for triggering a given state transition, irrespective of the direction of the transition, in some examples, the thresholds can be different depending on the direction of the state transition. For example, transitioning from the initial state 1302 to the warning state 1304 or the replacement state 1306 can use a higher first threshold and a higher second threshold (e.g., to avoid false positives). To trigger the transition from the replacement state 1306 or the warning state 1304 to initial state 1302 can require not exceeding a lower second threshold and/or a lower first threshold (e.g., to ensure tip is replaced).

Figure 14:
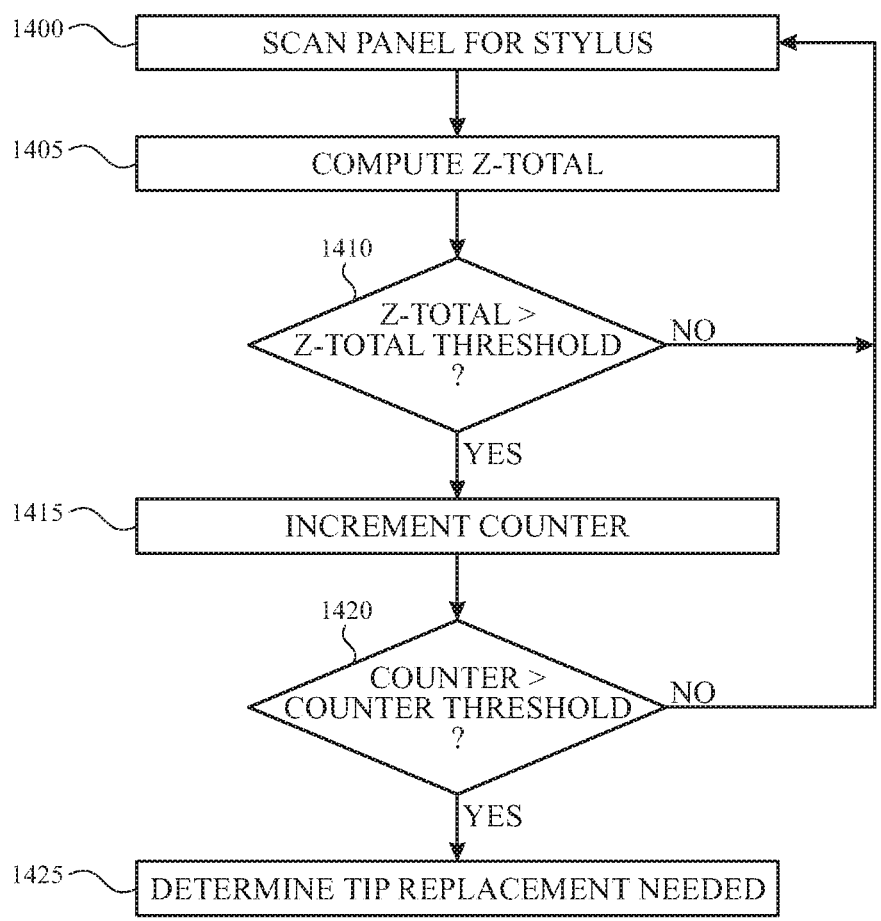
FIG. 14 illustrates an example process for determining that a stylus tip should be replaced according to the examples of the disclosure.

FIG. 14 illustrates an example process for determining that a stylus tip should be replaced according to the examples of the disclosure. At 1400, a touch and/or stylus sensing system (e.g., touch ASIC 201) of the touch-sensitive device can scan the touch sensor panel to detect an active stylus. At 1405, the measurements at one or more sensing nodes of the touch sensor panel can be used to generate a total signal parameter. In some examples, the measurements from multiple sensing nodes can be summed to generate $Z_{TOT}$ (or a historical $Z_{TOT}$). At 1410, $Z_{TOT}$ can be compared to a $Z_{TOT}$ threshold. If $Z_{TOT}$ does not exceed the $Z_{TOT}$ threshold, the system can wait for the next scan of the touch sensor panel. If $Z_{TOT}$ exceeds $Z_{TOT}$ threshold, a counter can be incremented at 1415. At 1420, the value of the counter can be compared to a counter threshold. If the counter does not exceed a counter threshold, the system can wait for the next scan of the touch sensor panel. If the counter exceeds the counter threshold, the system can determine that the stylus tip should be replaced at 1425. In response, the system can cause notifications to be displayed and disable the stylus. It should be understood that the process of FIG. 14 can be modified to accommodate one or more warning notifications.

Additionally or alternatively, a signal parameter like $Z_{TOT}$ can be used to re-enable stylus input functionality and/or enable or cause a notification to be removed from the display of a touch screen device. As described with reference to state diagram 1300 of FIG. 13, for example, the stylus input functionality can be re-enabled when the state transitions from a replacement state to either the warning state or the initial state based on $Z_{TOT}$ thresholds. In some examples, when the stylus input functionality is enabled, a notification (e.g., the notification of FIG. 10A) can be automatically removed from the display. In other examples, user input at an affordance of the notification (e.g., from the re-enabled stylus or other input object) can be received before removing the notification from the display. In some examples, the user input can include tapping a button (e.g., virtual buttons 1006 or 1016).

In some examples, the stylus can be re-enabled after a verification process. For example, as a modification to state diagram 1300 of FIG. 13, the state can transition from the replacement state to the initial state or the warning state when the $Z_{TOT}$ threshold conditions are satisfied in addition to receiving a verification request. For example, a user may replace the tip and request verification (e.g., actuating a graphical element such as a virtual button on notification 1000 or a menu). In response to the user verification request, the system can allow a state transition out of the replacement state based on the $Z_{TOT}$ thresholds to re-enable the stylus input functionality. In some examples, when a user makes a verification request, a different $Z_{TOT}$ parameter or threshold can be used to transition between states. For example, when a verification request is made, the system can use a single $Z_{TOT}$ measurement without consideration of a past history of $Z_{TOT}$ measurements to transition out of the replacement state, whereas without the verification request, the system can require consideration of the $Z_{TOT}$ history to transition out of the replacement state.

Disabling the stylus automatically using the $Z_{TOT}$ parameter (and using the $Z_{TOT}$ parameter to re-enable the stylus input functionality) can prevent users from ignoring notifications and continuing to use the stylus in a condition that can damage the device. Additionally, using the $Z_{TOT}$ parameter can provide for accurate wear tracking irrespective of how and where the wear is produced.

In some examples, an estimated distance traveled by the active stylus on touch-sensitive devices can be used to monitor wear of a stylus tip. For example, the active stylus and/or touch-sensitive device can track a parameter representative of the total distance traveled by the stylus as measured by one or more touch-sensitive devices. When the parameter representative of the total distance traveled by the stylus exceeds a threshold, the stylus can be disabled and/or a notification can be generated as described herein.

Figure 15:
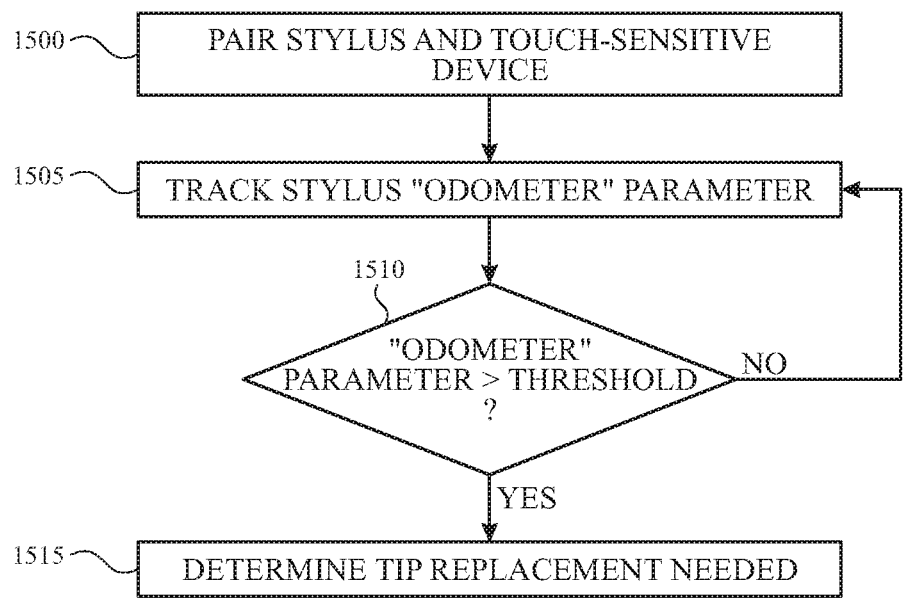
FIG. 15 illustrates another example process for determining that a stylus tip should be replaced according to the examples of the disclosure.

FIG. 15 illustrates another example process for determining that a stylus tip should be replaced according to the examples of the disclosure. At 1500, the active stylus and a touch sensing device can establish a wireless connection (e.g., BLUETOOTH™ pairing). The pairing can identify the specific stylus to the touch-sensitive device for stylus specific tracking. After establishing a connection, a stylus parameter can be tracked estimating the distance traveled by the stylus (referred to herein as an "odometer" parameter for the stylus) at 1505. At 1510, the stylus odometer parameter can be compared with a threshold (e.g., an odometer threshold). If the odometer parameter does not exceed the odometer threshold, the system can continue tracking the odometer parameter. If the odometer parameter exceeds the odometer threshold, the system can determine that the stylus tip should be replaced at 1515. In response the system can cause notifications to be displayed and/or disable the stylus. It should be understood that the process of FIG. 15 can be modified to accommodate one or more warning notifications.

The odometer parameter can be updated based on detection of the stylus by the touch-sensitive device. For example, the touch and/or stylus sensing system of the touch-sensitive device can scan the touch sensor panel to detect an active stylus at the surface of the touch-sensitive device. Stylus movement across the device can be tracked by the touch-sensitive device, and the estimated distances traveled by the stylus can be used to update the odometer parameter. In addition to tracking the estimated distances, other input from the stylus can be used to update the stylus odometer parameter. For example, even without corresponding movement across the surface of the touch-sensitive device, stylus touch-down events (e.g., a tap event), can result in wear. Each touch-down event can be measured by the touch-sensitive device and each touch-down event can be represented with a corresponding estimated distance used to update the odometer parameter.

In some examples, the estimated distances (whether from movement or touch-down event) can be adjusted based on other stylus parameters. For example, the amount of force between the stylus tip and touch-sensitive device surface during a touch-down event or movement across the surface can result in different wear rates. To account for the differences in wear rate, the force can be used to adjust (e.g., scale) the corresponding estimated distance. For example, a tap event with a first force, $F_1$, can correspond to a higher estimated distance than a tap event with a second force, $F_2$, where $F_1 > F_2$. As another example, the orientation of the stylus and/or the acceleration of the stylus can result in different wear levels. The estimated distance from movement and/or touch-down events can be adjusted according to orientation and/or acceleration parameters.

The stylus odometer parameter can be stored in memory in the touch-sensitive device and/or in the stylus. In some examples, the touch-sensitive device can store the stylus odometer parameter and each time the stylus is paired with the touch-sensitive device, the stylus odometer parameter can be updated at the touch-sensitive device according to tracking of the estimated distance as described herein. In some examples, to account for use of the stylus with multiple touch-sensitive devices, the stylus can store an odometer parameter. At pairing, the stylus can transfer the odometer reading to the touch-sensitive device. Thereafter, the stylus odometer parameter can be updated at the touch-sensitive device according to tracking of the estimated distance as described herein. The touch-sensitive device can also transfer updated odometer parameters to the stylus. In some examples, the stylus itself can keep track of the odometer parameter, and the touch-sensitive device can track update parameters which can be transferred to the stylus and added to the odometer reading. The stylus itself (e.g., processor 506) can compare the odometer reading to an odometer threshold and when the threshold is exceeded notify the touch-sensitive device that the tip should be replaced. The touch-sensitive device can then disable the stylus input functionality and/or display one or more notifications as described herein.

Although illustrated as using a single threshold in FIG. 15, the odometer parameter can be compared to more than one threshold. For example, one threshold can be used to indicate a replacement condition, and one or more additional thresholds can be used to indicate a warning condition. The one or more threshold can be set according to the stylus type and empirically determined stylus odometer readings for that stylus type corresponding to the threshold levels of wear.

Once the stylus odometer reaches the replacement condition/threshold, the stylus input functionality can be disabled as described herein. In order to re-enable the stylus functionality the user can provide input to the touch-sensitive device (e.g., a verification virtual button in a notification or a menu) indicating that the stylus tip portion has been replaced. In response to the user input, the stylus functionality can be re-enabled and the stylus odometer can also be reset.

In some examples, instead of tracking a parameter at a touch-sensitive device and disabling the stylus input functionality, the stylus tip portion itself can include a visual indicator of wear. For example, referring back to FIG. 8, the removable stylus tip 800 can include a non-conductive material 804, such as a plastic. The outmost layer can be white plastic, for example. An inner layer of the non-conductive material can have a colored layer (e.g., a red plastic layer) that when visible to the user can indicate that the tip should be replaced. In some examples, more than one color layer (or multiple shades of a color) can be used to provide an indication of wear. For example, the color may transition from white to a light red and then to a darker shade of red as wear continues. In some examples, the color may transition from white to orange to red.

Figure 16:
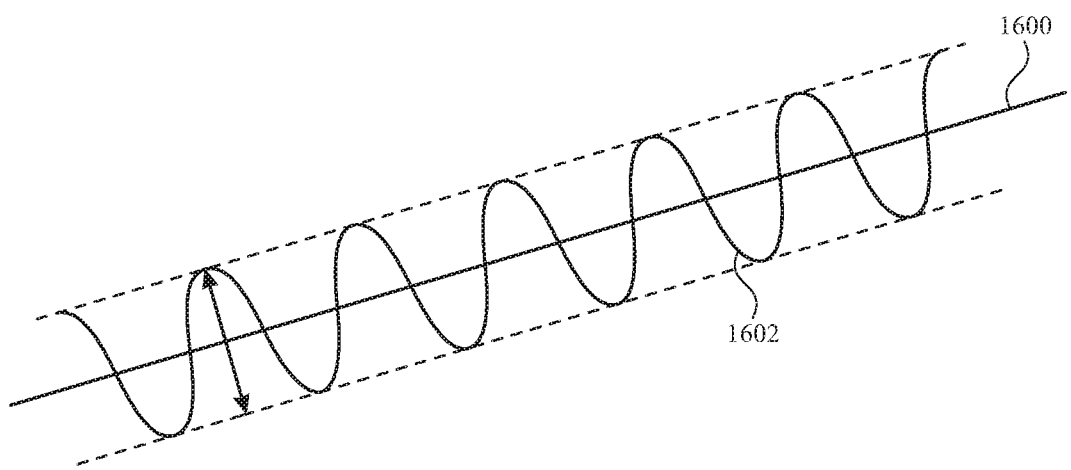
FIG. 16 illustrates an example wobble according to examples of the disclosure.

In some examples, degraded stylus performance can be a visual indicator of wear. In some examples, a stylus tip with little or no wear can have a wobble characteristic below an observable threshold, but as the tip wears the wobble can become large enough for a human to observe. When drawing a line diagonally across a touch sensor panel, rather than generating a straight line, the detected input can include an oscillating curve in the direction of the line due to errors between the detected location of the stylus tip and the actual position of the stylus tip (resulting from location detection algorithms, for example). Wobble can be a measure of the absolute amplitude or peak-to-peak amplitude of the oscillating curve (i.e., corresponding to the maximum location error). FIG. 16 illustrates an example wobble according to examples of the disclosure. FIG. 16 illustrates line 1600 drawn diagonally across a surface of a touch screen, for example. Rather than detecting and display a straight line, however, the location detection algorithms can detect and display an oscillating curve 1602 that can follow the path of line 1600. The peak-to-peak amplitude of the oscillating curve 1602 can be a measure of wobble indicative of the accuracy of location detection. As the stylus tip wears, increased wobble (one type of performance degradation) can be observed and provide a user with an indication that the stylus tip should be replaced.

It should be noted that more than one of the indicators of stylus wear discussed herein can be used in combination. For example, $Z_{TOT}$ parameter tracking can be used in addition to using a color changing tip portion. As another example, odometer parameter tracking can be used to disable the stylus input functionality and $Z_{TOT}$ parameter tracking can be used to re-enable the stylus input functionality.

It should be noted that although often described in the context of a stylus, the examples herein can be applied to other input devices interacting with touch-sensitive surfaces. Additionally, although often described with regard to a touch screen, the input devices can be used with touch-sensitive devices that do not include a touch screen.

Therefore, according to the above, some examples of the disclosure are directed to a system comprising a touch sensor panel and a processor coupled to the touch sensor panel. The processor can be capable of: tracking a parameter representative of an amount of tip wear of a tip portion of an active stylus, the parameter updated based on an input received at the touch sensor panel from the active stylus; in accordance with a determination that the parameter does not exceed a first threshold, performing an action associated with the input from the active stylus; and in accordance with a determination that the parameter exceeds the first threshold, rejecting the input from the active stylus. Additionally or alternatively to one or more of the examples disclosed above, in some examples, the processor can be further capable of: in accordance with the determination that the parameter exceeds the first threshold, displaying a notification to replace the tip portion of the active stylus. Additionally or alternatively to one or more of the examples disclosed above, in some examples, the processor can be further capable of: in accordance with a determination that the parameter does not exceed the first threshold and that the parameter exceeds a second threshold, displaying a warning notification. Additionally or alternatively to one or more of the examples disclosed above, in some examples, the parameter can be a measure of a total signal strength of the input from the active stylus detected at one or more electrodes of the touch sensor panel. Additionally or alternatively to one or more of the examples disclosed above, in some examples, the parameter can be based on a history of measurements of a total signal strength of inputs from the active stylus detected at one or more electrodes of the touch sensor panel. Additionally or alternatively to one or more of the examples disclosed above, in some examples, the parameter can be a measure of an estimated distance traversed by the tip portion of the active stylus across the touch sensor panel.

Other examples of the disclosure are directed to a method. The method can comprise: tracking a parameter representative of an amount of tip wear of a tip portion of an active stylus, the parameter updated based on an input received from the active stylus; in accordance with a determination that the parameter does not exceed a first threshold, performing an action associated with the input from the active stylus; and in accordance with a determination that the parameter exceeds the first threshold, rejecting the input from the active stylus. Additionally or alternatively to one or more of the examples disclosed above, in some examples, the method can further comprise: in accordance with the determination that the parameter exceeds the first threshold, displaying a notification to replace the tip portion of the active stylus. Additionally or alternatively to one or more of the examples disclosed above, in some examples, the method can further comprise: in accordance with a determination that the parameter does not exceed the first threshold and that the parameter exceeds a second threshold, displaying a warning notification. Additionally or alternatively to one or more of the examples disclosed above, in some examples, the parameter can be a measure of a total signal strength of the input from the active stylus detected at one or more electrodes. Additionally or alternatively to one or more of the examples disclosed above, in some examples, the parameter can be based on a history of measurements of a total signal strength of inputs from the active stylus detected at one or more electrodes. Additionally or alternatively to one or more of the examples disclosed above, in some examples, the parameter can be a measure of an estimated distance traversed by the tip portion of the active stylus across a touch sensitive surface.

Some examples of the disclosure are directed to a non-transitory computer readable storage medium. The computer readable medium can contain instructions, which when executed by a processor, can cause the processor to: track a parameter representative of an amount of tip wear of a tip portion of an active stylus, the parameter updated based on an input received from the active stylus; in accordance with a determination that the parameter does not exceed a first threshold, perform an action associated with the input from the active stylus; and in accordance with a determination that the parameter exceeds the first threshold, reject the input from the active stylus. Additionally or alternatively to one or more of the examples disclosed above, in some examples, the instructions, when executed, can further cause the processor to: in accordance with the determination that the parameter exceeds the first threshold, display a notification to replace the tip portion of the active stylus. Additionally or alternatively to one or more of the examples disclosed above, in some examples, the instructions, when executed, can further cause the processor to: in accordance with a determination that the parameter does not exceed the first threshold and that the parameter exceeds a second threshold, display a warning notification. Additionally or alternatively to one or more of the examples disclosed above, in some examples, the parameter can be a measure of a total signal strength of the input from the active stylus detected at one or more electrodes. Additionally or alternatively to one or more of the examples disclosed above, in some examples, the parameter can be based on a history of measurements of a total signal strength of inputs from the active stylus detected at one or more electrodes. Additionally or alternatively to one or more of the examples disclosed above, in some examples, the parameter can be a measure of an estimated distance traversed by the tip portion of the active stylus across a touch sensitive surface.

Some examples of the disclosure are directed to an electronic device for use with a stylus. The electronic device can comprise a touch screen and a processor coupled to the touch screen. The processor can be capable of: estimating a level of wear of a stylus tip; and in accordance with a determination that the level of wear of the stylus tip exceeds a first threshold, disabling stylus input functionality of the electronic device. Additionally or alternatively to one or more of the examples disclosed above, in some examples, the processor can be further capable of: in accordance with a determination that the level of wear of the stylus tip exceeds the first threshold, displaying on the touch screen a notification including instructions to replace the stylus or stylus tip. Additionally or alternatively to one or more of the examples disclosed above, in some examples, the processor can be further capable of: in accordance with a determination that the level of wear of the stylus tip does not exceed the first threshold and that the level of wear of the stylus tip exceeds a second threshold, displaying on the touch screen a notification including a warning regarding the level of wear. Additionally or alternatively to one or more of the examples disclosed above, in some examples, the processor can be further capable of: in accordance with a determination that the level of wear of the stylus tip does not exceed the first threshold, enabling the stylus input functionality of the electronic device. Additionally or alternatively to one or more of the examples disclosed above, in some examples, estimating the level of wear of the stylus tip can comprise measuring an average total signal strength of inputs from the stylus tip detected on the touch screen. Additionally or alternatively to one or more of the examples disclosed above, in some examples, estimating the level of wear of the stylus tip can comprise estimating a total distance traversed by the stylus tip across the touch screen.

Although examples have been fully described with reference to the accompanying drawings, it is to be noted that various changes and modifications will become apparent to those skilled in the art. Such changes and modifications are to be understood as being included within the scope of the various examples as defined by the appended claims.

What is claimed is:

1. A system comprising:
a touch sensor panel; and a processor coupled to the touch sensor panel and capable of:
tracking a parameter representative of an amount of tip wear of a tip portion of an active stylus, the parameter updated based on an input received at the touch sensor panel from the active stylus, wherein the parameter comprises a measure of a total capacitive signal strength of the input from the active stylus detected at one or more electrodes of the touch sensor panel;
in accordance with a determination that the parameter does not exceed a first threshold, performing an action associated with the input from the active stylus; and
in accordance with a determination that the parameter exceeds the first threshold, rejecting the input from the active stylus.

2. The system of claim 1, the processor further capable of:
in accordance with the determination that the parameter exceeds the first threshold, displaying a notification to replace the tip portion of the active stylus.

3. The system of claim 1, the processor further capable of:
in accordance with a determination that the parameter does not exceed the first threshold and that the parameter exceeds a second threshold, displaying a warning notification.

4. The system of claim 1, wherein the first threshold is set based on a tilt angle of the active stylus.

5. The system of claim 1, wherein the parameter is based on a history of measurements of a total capacitive signal strength of inputs from the active stylus detected at one or more electrodes of the touch sensor panel.

6. A method comprising:
tracking a parameter representative of an amount of tip wear of a tip portion of an active stylus, the parameter updated based on an input received from the active stylus, wherein the parameter comprises a measure of a total capacitive signal strength of the input from the active stylus detected at one or more electrodes of a touch sensor panel:
in accordance with a determination that the parameter does not exceed a first threshold, performing an action associated with the input from the active stylus; and
in accordance with a determination that the parameter exceeds the first threshold, rejecting the input from the active stylus.

7. The method of claim 6, further comprising:
in accordance with the determination that the parameter exceeds the first threshold, displaying a notification to replace the tip portion of the active stylus.

8. The method of claim 6 further comprising:
in accordance with a determination that the parameter does not exceed the first threshold and that the parameter exceeds a second threshold, displaying a warning notification.

9. The method of claim 6, wherein the first threshold is set based on a tilt angle of the active stylus.

10. The method of claim 6, wherein the parameter is based on a history of measurements of a total capacitive signal strength of inputs from the active stylus detected at one or more electrodes.

11. A non-transitory computer readable storage medium storing instructions, which when executed by a processor, cause the processor to:
track a parameter representative of an amount of tip wear of a tip portion of an active stylus, the parameter updated based on an input received from the active stylus, wherein the parameter comprises a measure of a total capacitive signal strength of the input from the active stylus detected at one or more electrodes of a touch sensor panel:
in accordance with a determination that the parameter does not exceed a first threshold, perform an action associated with the input from the active stylus; and
in accordance with a determination that the parameter exceeds the first threshold, reject the input from the active stylus.

12. The non-transitory computer readable storage medium of claim 11, wherein the instructions, when executed, further cause the processor to:
in accordance with the determination that the parameter exceeds the first threshold, display a notification to replace the tip portion of the active stylus.

13. The non-transitory computer readable storage medium of claim 11, wherein the instructions, when executed, further cause the processor to:
in accordance with a determination that the parameter does not exceed the first threshold and that the parameter exceeds a second threshold, display a warning notification.

14. The non-transitory computer readable storage medium of claim 11, wherein the first threshold is set based on a tilt angle of the active stylus.

15. The non-transitory computer readable storage medium of claim 11, wherein the parameter is based on a history of measurements of a total capacitive signal strength of inputs from the active stylus detected at one or more electrodes.

16. The non-transitory computer readable storage medium of claim 11, wherein the parameter is a measure of an estimated distance traversed by the tip portion of the active stylus across a touch sensitive surface.

17. An electronic device for use with a stylus comprising:
a touch screen; and
a processor coupled to the touch screen and capable of:
estimating a level of wear of a stylus tip by tracking a parameter representative of an amount of tip wear of a tip portion of an active stylus the parameter updated based on an input received at the touch sensor panel from the active stylus, wherein the parameter comprises a measure of a total capacitive signal strength of the input from the active stylus detected at one or more electrodes of the touch screen;
in accordance with a determination that the level of wear of the stylus tip exceeds a first threshold, disabling stylus input functionality of the electronic device; and
in accordance with a determination that the level of wear of the stylus tip does not exceed the first threshold while the stylus input functionality of the electronic device is disabled, re-enabling the stylus input functionality of the electronic device.

18. The electronic device of claim 17, the processor further capable of:
in accordance with a determination that the level of wear of the stylus tip exceeds the first threshold, displaying on the touch screen a notification including instructions to replace the stylus or stylus tip.

19. The electronic device of claim 17, the processor further capable of:
in accordance with a determination that the level of wear of the stylus tip does not exceed the first threshold and that the level of wear of the stylus tip exceeds a second threshold, displaying on the touch screen a notification including a warning regarding the level of wear.

20. The electronic device of claim 18, the processor further capable of:
in accordance with a determination that the level of wear of the stylus tip does not exceed the first threshold while displaying the notification, cease displaying the notification on the touch screen.

21. The electronic device of claim 17, wherein estimating the level of wear of the stylus tip comprises measuring an average total capacitive signal strength of inputs from the stylus tip detected on the touch screen.

22. The electronic device of claim 17, wherein estimating the level of wear of the stylus tip comprises estimating a total distance traversed by the stylus tip across the touch screen.

* * * * *